(12) United States Patent
Saha et al.

(10) Patent No.: US 11,588,804 B2
(45) Date of Patent: Feb. 21, 2023

(54) PROVIDING VERIFIED CLAIMS OF USER IDENTITY

(71) Applicant: Apple Inc., Cupertino, CA (US)

(72) Inventors: Rupamay Saha, San Jose, CA (US); Brandon K. Leventhal, San Francisco, CA (US); Christopher Sharp, San Jose, CA (US); Vishnu Janardhanan Pillai, Fremont, CA (US); Gianpaolo Fasoli, Redwood City, CA (US); Augustin J. Farrugia, Los Altos Hills, CA (US)

(73) Assignee: Apple Inc., Cupertino, CA (US)

( * ) Notice: Subject to any disclaimer, the term of this patent is extended or adjusted under 35 U.S.C. 154(b) by 211 days.

(21) Appl. No.: 16/726,722

(22) Filed: Dec. 24, 2019

(65) Prior Publication Data

US 2020/0213302 A1 Jul. 2, 2020

Related U.S. Application Data

(60) Provisional application No. 62/822,988, filed on Mar. 24, 2019, provisional application No. 62/822,987, (Continued)

(51) Int. Cl.
*H04L 29/06* (2006.01)
*H04L 9/40* (2022.01)
(Continued)

(52) U.S. Cl.
CPC .......... *H04L 63/0807* (2013.01); *H04L 9/006* (2013.01); *H04L 9/3073* (2013.01);
(Continued)

(58) Field of Classification Search
CPC ... H04L 63/0807; H04L 9/006; H04L 9/3073; H04L 9/321; H04L 9/3236; H04L 9/3247;
(Continued)

(56) References Cited

U.S. PATENT DOCUMENTS 5,987,232 A * 11/1999 Tabuki .................... G06F 21/31
709/229
7,206,936 B2 4/2007 Aull
(Continued)

OTHER PUBLICATIONS

International Search Report and Written Opinion from PCT/US2019/063756, dated Feb. 5, 2020, 16 pages.

*Primary Examiner* — John B King
(74) *Attorney, Agent, or Firm* — BakerHostetler

(57) ABSTRACT

A device implementing a system for using a verified claim of identity includes at least one processor configured to receive a verified claim including information to identify a user of a device, the verified claim being signed by a server based on verification of the information by an identity verification provider separate from the server, the verified claim being specific to the device. The at least one processor is further configured to send, to a service provider, a request for a service provided by the service provider, and receive, from the service provider and in response to the sending, a request for the verified claim. The at least one processor is further configured to send, in response to the receiving, the verified claim to the service provider.

23 Claims, 18 Drawing Sheets

Related U.S. Application Data filed on Mar. 24, 2019, provisional application No. 62/820,820, filed on Mar. 19, 2019, provisional application No. 62/795,528, filed on Jan. 22, 2019, provisional application No. 62/786,309, filed on Dec. 28, 2018.

(51) Int. Cl.
  *H04L 9/32* (2006.01)
  *H04L 9/00* (2022.01)
  *H04L 9/30* (2006.01)

(52) U.S. Cl.
  CPC ............ *H04L 9/321* (2013.01); *H04L 9/3236* (2013.01); *H04L 9/3247* (2013.01); *H04L 9/3263* (2013.01); *H04L 9/3268* (2013.01); *H04L 63/083* (2013.01); *H04L 63/0823* (2013.01); *H04L 63/0861* (2013.01); *H04L 63/0876* (2013.01); *H04L 63/0884* (2013.01); *H04L 63/102* (2013.01); *H04L 9/50* (2022.05)

(58) Field of Classification Search
  CPC . H04L 9/3263; H04L 9/3268; H04L 63/0823; H04L 63/083; H04L 63/0861; H04L 63/0876; H04L 63/0884; H04L 63/102; H04L 2209/38; H04L 9/50; G06F 21/335; G06F 21/44; H04W 12/069; H04W 12/06
  See application file for complete search history.

(56) References Cited

U.S. PATENT DOCUMENTS

| | | | |
|---|---|---|---|
| 8,095,969 | B2 | 1/2012 | Dillaway |
| 8,261,979 | B2 | 9/2012 | Gressel |
| 8,639,926 | B2 | 1/2014 | Brown |
| 8,843,997 | B1 | 9/2014 | Hare |
| 8,850,550 | B2 | 9/2014 | Dalzell |
| 9,038,138 | B2 | 5/2015 | Trammel |
| 9,648,003 | B2 | 5/2017 | Lund |
| 9,805,213 | B1 | 10/2017 | Kragh |
| 10,243,945 | B1 * | 3/2019 | Kruse .................. H04L 63/126 |
| 10,956,932 | B2 | 3/2021 | Smith |
| 11,106,718 | B2 | 8/2021 | Krasadakis |
| 2004/0181665 | A1 | 9/2004 | Houser |
| 2008/0282348 | A1 | 11/2008 | Proudler |
| 2009/0098857 | A1 | 4/2009 | De Atley |
| 2009/0235068 | A1 * | 9/2009 | Song ..................... H04L 9/3231 713/156 |
| 2011/0107294 | A1 | 5/2011 | Ionfrida |
| 2012/0293642 | A1 * | 11/2012 | Berini ................. G06F 21/6245 348/77 |
| 2015/0065052 | A1 | 3/2015 | Heo |
| 2015/0304110 | A1 | 10/2015 | Oberheide et al. |
| 2016/0142409 | A1 * | 5/2016 | Frei ..................... H04L 63/0884 713/176 |
| 2016/0365984 | A1 * | 12/2016 | Lee ....................... H04L 9/3263 |
| 2016/0366119 | A1 * | 12/2016 | Rykowski .......... H04L 63/0815 |
| 2017/0171200 | A1 | 6/2017 | Bao |
| 2017/0257454 | A1 | 9/2017 | Hughes |
| 2017/0374070 | A1 | 12/2017 | Shah |
| 2018/0108008 | A1 | 4/2018 | Chumbley |
| 2018/0294977 | A1 * | 10/2018 | Uhr ........................... H04L 9/32 |
| 2018/0332033 | A1 * | 11/2018 | Lakhani .................. G06F 21/35 |
| 2019/0028460 | A1 | 1/2019 | Bhargava |
| 2019/0044940 | A1 | 2/2019 | Khalil |
| 2019/0073676 | A1 | 3/2019 | Wang |
| 2019/0236257 | A1 | 8/2019 | Last |
| 2019/0268284 | A1 | 8/2019 | Karame |
| 2019/0327245 | A1 * | 10/2019 | Holton ................ H04L 63/0853 |
| 2019/0363886 | A1 * | 11/2019 | Atwood ............. H04L 63/0807 |
| 2019/0379797 | A1 | 12/2019 | Sahagun |
| 2020/0007536 | A1 | 1/2020 | Piel |
| 2020/0084036 | A1 * | 3/2020 | Rowe ..................... H04L 9/0891 |
| 2020/0084211 | A1 | 3/2020 | Wang |
| 2021/0065267 | A1 * | 3/2021 | Smith ................ G06Q 20/4014 |
| 2021/0067340 | A1 * | 3/2021 | Ferenczi ................... H04L 9/30 |

* cited by examiner

PROVIDING VERIFIED CLAIMS OF USER IDENTITY

CROSS-REFERENCE TO RELATED APPLICATIONS

The present application claims the benefit of: U.S. Provisional Patent Application Ser. No. 62/786,309, entitled "Providing Verified Claims of User Identity," filed on Dec. 28, 2018; U.S. Provisional Patent Application Ser. No. 62/795,528, entitled "Providing Verified Claims of User Identity," filed on Jan. 22, 2019; U.S. Provisional Patent Application Ser. No. 62/820,820, entitled "Providing Verified Claims of User Identity," filed on Mar. 19, 2019; U.S. Provisional Patent Application Ser. No. 62/822,987, entitled "Providing Verified Claims of User Identity," filed on Mar. 24, 2019; and U.S. Provisional Patent Application Ser. No. 62/822,988, entitled "Providing Verified Claims of User Identity," filed on Mar. 24, 2019, each of which is hereby incorporated by reference in its entirety for all purposes.

TECHNICAL FIELD

The present description relates generally to providing verified user identity claims, including providing a verified user identity claim that may be used by a user to confirm their identity, such as to a service provider.

BACKGROUND

Some service provider(s) may require identity and verification to register users. The verification may be performed by an identity verification provider.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
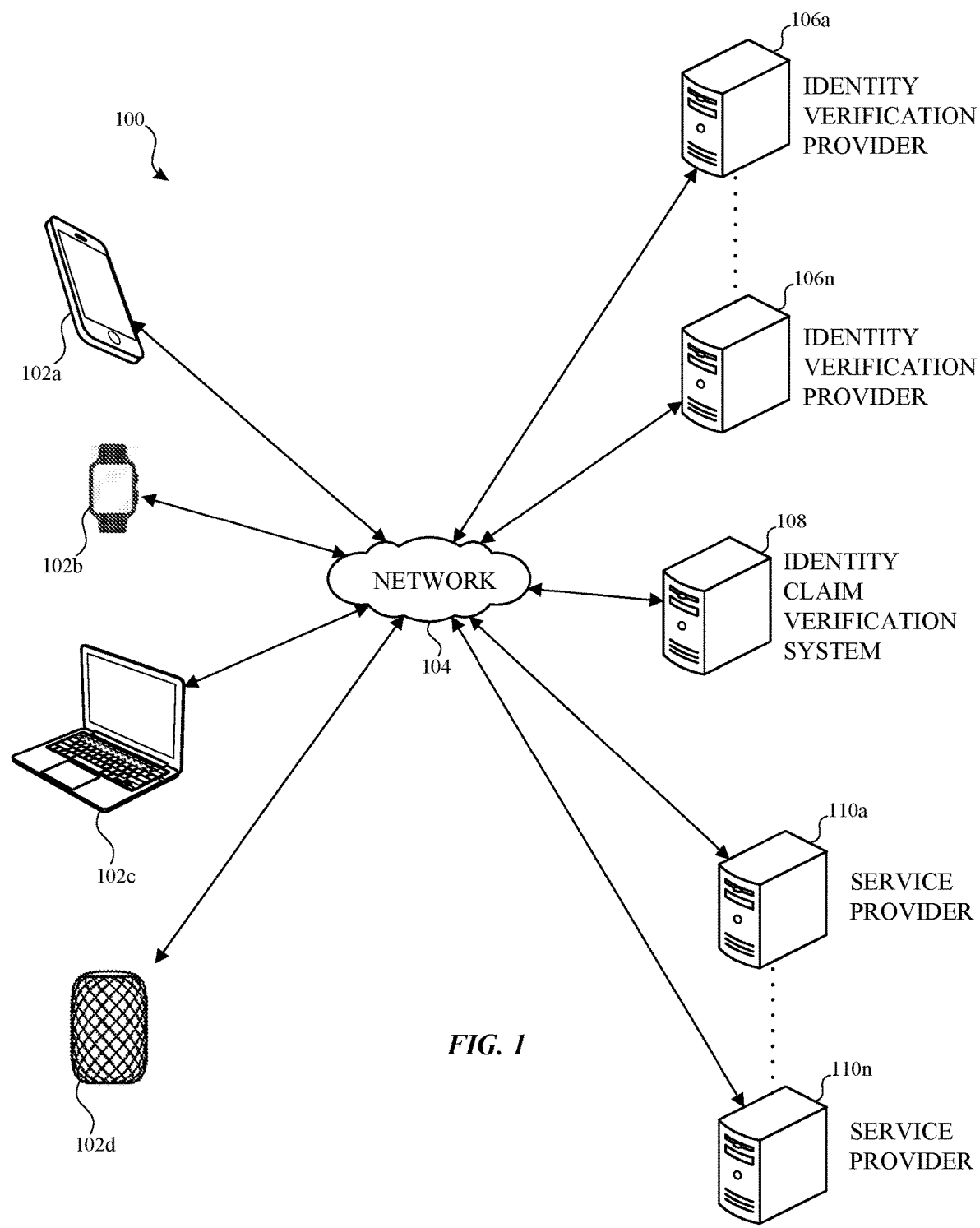
FIG. 1 illustrates an example network environment for enrolling for and/or sharing a verified claim of identity in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

A user may wish to use their device to serve as a form of digital identity for the user. For example, as noted above, some service providers require identity and verification to register users. As such, these service providers may need to establish their own identity and verification processes (e.g., based on the level of verification required to access their respective services). Moreover, a user who registers with multiple service providers may have to go through multiple redundant identity and verification processes (e.g., one for each service provider), resulting in repetitive sharing of sensitive user data.

The subject system allows a user to obtain a verified claim of identity that serves as a digital identity for the user, that includes information for identifying the user (e.g., information that was provided by the user and verified by one or more systems), and that can be re-used across different service providers. Thus, a verified claim of identity may correspond to a claim that information, provided by a user for identifying the user, has been verified by one or more systems. In one or more implementations, the verified claim may be implemented as a data structure (e.g., a JSON data structure) that includes a claim header to identify the verified claim, and a Merkle tree which includes the identifying information for the user.

The user's device may receive a verified claim signed by a trusted identity claim verification system, based on verification of the information contained in the claim by an identity verification provider. The trusted identity claim verification system may act as a middle man and may provide confidence assessment(s) (e.g., may vouch) for the identity of the user as indicated in the signed verified claim (e.g., after verifying the user's identity with an identity verification provider). The verified claim may be specific to the user's device by a public key of a public-private key pair corresponding to a secure hardware component of the user's device. The public key may be included as part of the verified claim.

In one or more implementations, when a user is registered with a particular service provider, the service provider may request the verified claim from the user's device (e.g., where the request may include a nonce to be signed by the user's device). For example, the user's device may sign the nonce with the private key corresponding to the public key contained in the verified claim, and may provide the verified claim (e.g., together with the signed nonce) to the service provider for the service provider to verify the identity of the user as indicated in the verified claim. By virtue of the user's device having signed for the verified claim using the private key (e.g., of a private-public key pair), the service provider can use the public key contained in the verified claim to confirm that the user's device is in possession of the corresponding private key. Such signing of the verified claim may correspond to confirmation by the user's device that the verified claim is specific to the device.

Moreover, the user's device may have received an identity status attestation from the identity claim verification system, attesting that the verified claim is valid and has not been revoked. For example, the identity claim verification system may have signed a certificate that the verified claim has not been revoked, thereby further confirming the validity of the verified claim.

In addition, the subject system may provide the service provider with assessment data (e.g., in conjunction with the verified claim), which can be used by the service provider to determine whether or not to accept a verified claim submitted by a user, e.g., to register with the service provider. In one example, the assessment data is generated on the user's device based on content stored locally on the user's device, where the content can be used to determine if the user of the device matches the user information contained in the user's verified claim. For example, based on an opt-in policy (e.g., where the user opts-in to allow for the use of the locally stored data in generating the assessment data), the user's device compares user information fields in the verified claim with corresponding user data that is derived from locally-stored data on the user's device (e.g., from emails, messages, social networking content, and the like) to generate assessment data. The resulting assessment data (e.g., a confidence assessment) may be used by the service provider to further analyze the verified claim submitted by the user, e.g., to determine whether to accept the verified claim.

In another example, assessment data may be generated based on assessments of the user information data fields of the verified claim as determined by an identity verification provider(s) (e.g., based on user opt-in). The identity verification provider may calculate a score for each of the data fields (e.g., name, address, email and the like) included in the verified claim, by comparing the fields in the verified claim (e.g., signed by the claim verification system) with values accessible by the identity verification provider (e.g., from an agency database, public records, and the like).

In one or more implementations, one or more of the aforementioned examples of assessment data may be represented as a response vector, in which each data value indicates an accuracy likelihood (and/or confidence score) for corresponding user information data fields in the verified claim. Thus, the service provider may receive a first response vector with scores based local device data comparisons, and a second response vector with scores based on information obtained by an identity verification provider. In this manner, the service provider is provided with more discrete information for verifying the user's identifying information (or the portions of the user's identifying information that the service provider deems important).

In another example, assessment data may be determined based on an overall account assessment associated with the user, such as based on an existing account that the user already has with the identity claim verification system (and/or an account for which the identity claim verification system has access to). For example, an indication of a user's likelihood to pay (e.g., based on past payment history) and/or fraudulent activity associated with the user's account that can be attributed to the user may be determined. The indication may be provided to the service provider in its determination of whether to register a user.

In one or more implementations, the subject system may aggregate, or triangulate, the different assessment data to generate an overall assessment for the user, such as an aggregate score for the user (e.g., where the user has opted in for such providing of a score). The aggregate score may be provided to the service provider in conjunction with the user's verified claim for further analysis by the service provider.

In some cases, the subject system provides for revocation of a verified claim. For example, the user may have logged into their user account (e.g., via a separate device) to report their device as lost/stolen (e.g., based on a "find my phone" request) and/or to request a remote wipe of their device. Alternatively, the user may have locally requested to remove data on their device (e.g., via a "wipe" command). In such instances, it may be desirable for the verified claim on the user's device to not be accessible by a third party, such as for use in a fraudulent manner (e.g., by another user who happened to find the lost phone). Thus, the subject system provides for revocation of a verified claim such that, e.g., a verified claim on the device (e.g., a lost device) can be revoked. The revocation may cause the verified claim information (e.g., the verified claim and/or the private key) to be deleted on the user's device. The revocation may also cause the identity claim verification system to add the verified claim to a revocation list. The service provider may deny service to the device based on the verified claim appearing on the revocation list, as well as the removal of the verified claim and/or private key on the client device (which would render the device unable to sign a nonce provided by the service provider with the private key).

Moreover, in some cases, the service provider may require additional identifying information (e.g., with respect to the information provided by the verified claim and assessment data) for onboarding a user (based on the user's identifying information that the service provider deems important). Thus, the service provider may request the additional identifying information from the user of the client device, such as by prompting the user for the additional identifying information.

Thus, the subject system allows a user to obtain a verified claim of identity that can be reused across multiple different service providers without having to repeat an identity verification process for each service provider. Although the verified claim of identity is signed by the subject system (e.g., the trusted identity claim verification system that provides confidence assessment(s) for the identity of the user after verifying the user's identity with an identity verification provider), the subject system can also provide service providers with multiple different forms of assessment data that can be used by the service providers to further verify the identity of the user. If a service provider is still not confident in the identity of the user, the service provider can then prompt the user to provide additional identifying information. Lastly, the subject system provides a revocation system that enables users to revoke a verified claim at any time (e.g., by the user, service provider(s) and/or the identity claim verification system).

FIG. 1 illustrates an example network environment for enrolling for and/or sharing a verified claim of identity in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes electronic devices 102a, 102b, 102c and 102d (hereinafter 102a-102d), a network 104, identity verification providers 106a-106n, an identity claim verification system 108 and service providers 110a-110n. The network 104 may communicatively (directly or indirectly) couple, for example, any two or more of the electronic devices 102a-102d, identity verification providers 106a-106n, the identity claim verification system 108 and the service providers 110a-110n. In one or more implementations, the network 104 may be an interconnected network of devices that may include, and/or may be communicatively coupled to, the Internet. For explanatory purposes, the network environment 100 is illustrated in FIG. 1 as including the electronic devices 102a-102d, the identity verification providers 106a-106n, the identity claim verification system 108 and the service providers 110a-110n; however, the network environment 100 may include any number of electronic devices, identity verification providers, identity claim verification systems and/or service providers.

One or more of the electronic devices 102a-102d may be, for example, a portable computing device such as a laptop computer, a smartphone, a smart speaker, a peripheral device (e.g., a digital camera, headphones), a tablet device, a wearable device such as a smartwatch, a band, a head mounted display, and the like, or any other appropriate device that includes, for example, one or more wireless interfaces, such as WLAN radios, cellular radios, Bluetooth radios, Zigbee radios, near field communication (NFC) radios, and/or other wireless radios. In FIG. 1, by way of example, the electronic device 102a is depicted as a smartphone, the electronic device 102b is depicted as a smartwatch, the electronic device 102c is depicted as a laptop, and the electronic device 102d is depicted as a smart speaker. Each of the electronic devices 102a-102d may be, and/or may include all or part of, the device discussed below with respect to FIG. 2, and/or the electronic system discussed below with respect to FIG. 15.

One or more of the identity verification providers 106a-106n, the identity claim verification system 108, and/or the service providers 110a-110n may be, and/or may include all or part of the electronic system discussed below with respect to FIG. 15. One or more of the identity verification providers 106a-106n, the identity claim verification system 108, and/or the service providers 110a-110n may include one or more servers, such as a cloud of servers. For explanatory purposes, multiple identity verification providers 106a-106n, a single identity claim verification system 108, and multiple service providers 110a-110n are shown and discussed with respect to various operations. However, these and other operations discussed herein may be performed by one or more servers, and each different operation may be performed by the same or different servers.

As described herein, one or more of the electronic devices 102a-102d may obtain a respective verified claim of identity (e.g., for the same user account and/or for different user accounts), with information to identify a user, from the identity claim verification system 108. The verified claim can be re-used by the respective electronic device to onboard with one of more of the service providers 110a-110n.

The verified claim may be signed by the identity claim verification system 108, based on verification of the information contained in the verified claim by one or more of the identity verification providers 106a-106n, and/or additional assessment data to which the identity claim verification system 108 has access. In one or more implementations, one or more of the identity verification providers 106a-106n may be configured to generate the verified claim, sign the verified claim, and send the verified claim to the identity claim verification system 108. In turn, the identity claim verification system 108 may remove the signature (as signed by the respective one of the identity verification providers 106a-106n), and re-sign the verified claim for sending back to one or more of the electronic devices 102a-102d.

Alternatively or in addition, one or more of the identity verification providers 106a-106n may not be configured to generate the verified claim and may instead simply send an indication that the identifying information (e.g., as provided by the user) has been verified. The identity claim verification system 108 may be configured to generate the verified claim, sign the verified claim, and provide the signed verified claim to one or more of the electronic devices 102a-102n.

Figure 2:
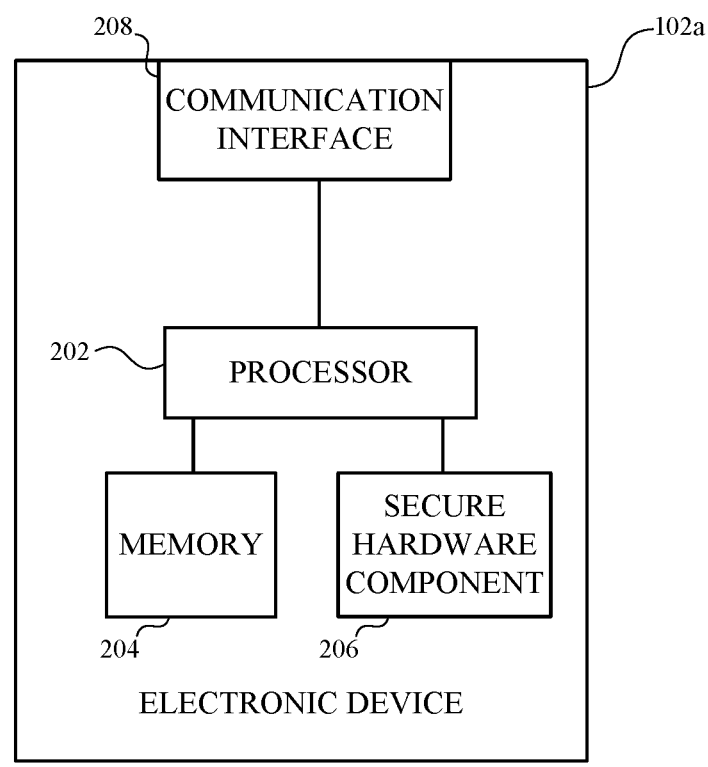
FIG. 2 illustrates an example electronic device that may implement the subject system for enrolling for and/or sharing a verified claim of identity in accordance with one or more implementations.

FIG. 2 illustrates an example electronic device that may implement the subject system for enrolling for and/or sharing a verified claim of identity in accordance with one or more implementations. For explanatory purposes, FIG. 2 is primarily described herein with reference to the electronic device 102a. However, FIG. 2 may correspond to any of the electronic devices 102a-102d of FIG. 1. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The electronic device 102a may include a processor 202, a memory 204, a secure hardware component 206 and a communication interface 208. The processor 202 may include suitable logic, circuitry, and/or code that enable processing data and/or controlling operations of the electronic device 102a. In this regard, the processor 202 may be enabled to provide control signals to various other components of the electronic device 102a. The processor 202 may also control transfers of data between various portions of the electronic device 102a. Additionally, the processor 202 may enable implementation of an operating system or otherwise execute code to manage operations of the electronic device 102a.

The memory 204 may include suitable logic, circuitry, and/or code that enable storage of various types of information such as received data, generated data, code, and/or configuration information. The memory 204 may include, for example, random access memory (RAM), read-only memory (ROM), flash, and/or magnetic storage.

The secure hardware component 206 may be configured to securely store data and may include its own memory and/or operating system. In one or more implementations, the secure hardware component 206 may correspond to a secure element, a secure enclave processor, a secure processor and/or a secure execution environment. Moreover, the operating system and/or execution environment of the secure hardware component 206 may be a JAVA-based operating system and/or JAVA-based execution environment, and one or more applet instances provisioned by the secure hardware component 206 may be JAVA-based applets. In other implementations, other operating systems, languages, and/or environments can be implemented. In addition to the one or more applet instances, the secure hardware component 206 may also include one or more additional applets for performing operations, such as a security applet, a registry applet, and the like.

In one or more implementations, the secure hardware component 206 may be configured to store a private key of a public-private key pair, where the corresponding public key ties the verified claim to the electronic device 102*a* (e.g., such that the public key is specific to the electronic device 102*a*). Alternatively or in addition, the secure hardware component 206 may have separate key(s) (e.g., a reference key or master key) for encrypting data stored in the memory 204 of the electronic device 102*a*. Thus, the private key may instead be stored in the memory 204 of the electronic device 102*a*, where the private key is signed/backed by the reference key(s) in the secure hardware component 206. The signing of the verified claim via the private key may correspond to a confirmation by the electronic device 102*a* that the verified claim came from the electronic device 102*a*. As such, use of the verified claim is specific to the electronic device 102*a*. As described herein, the secure hardware component 206 may be optional, In one or more implementations, the verified claim may be specific to the electronic device 102*a* by one or more of a hardware reference key (e.g., a public key of a public-private key pair that is based on a device hardware component), a software reference key (e.g., a key that is based on a device software component), a hardware device identifier and/or a software device identifier.

In one or more implementations, the electronic device 102*a* may implement a secure mailbox mechanism which provides for communication between the secure hardware component 206 and other devices. In the secure mailbox mechanism, other devices may transmit messages to an inbox. The secure hardware component 206 may read and interpret the message, determining the actions to take in response to the message. Response messages from the secure hardware component 206 may be transmitted through an outbox, which is also part of the secure mailbox mechanism. In one or more implementations, no other access from the external devices to the secure hardware component 206 may be permitted.

The communication interface 208 may include suitable logic, circuitry, and/or code that enables wired or wireless communication, such as with any of the electronic devices 102*b*-102*d*, the identity verification providers 106*a*-106*n*, the identity claim verification system 108, and the service providers 110*a*-110*n* over the network 104. The communication interface 208 may include, for example, one or more of a Bluetooth communication interface, a cellular interface, an NFC interface, a Zigbee communication interface, a WLAN communication interface, a USB communication interface, or generally any communication interface.

In one or more implementations, one or more of the processor 202, the memory 204, the secure hardware component 206, the communication interface 208, and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Figure 3:
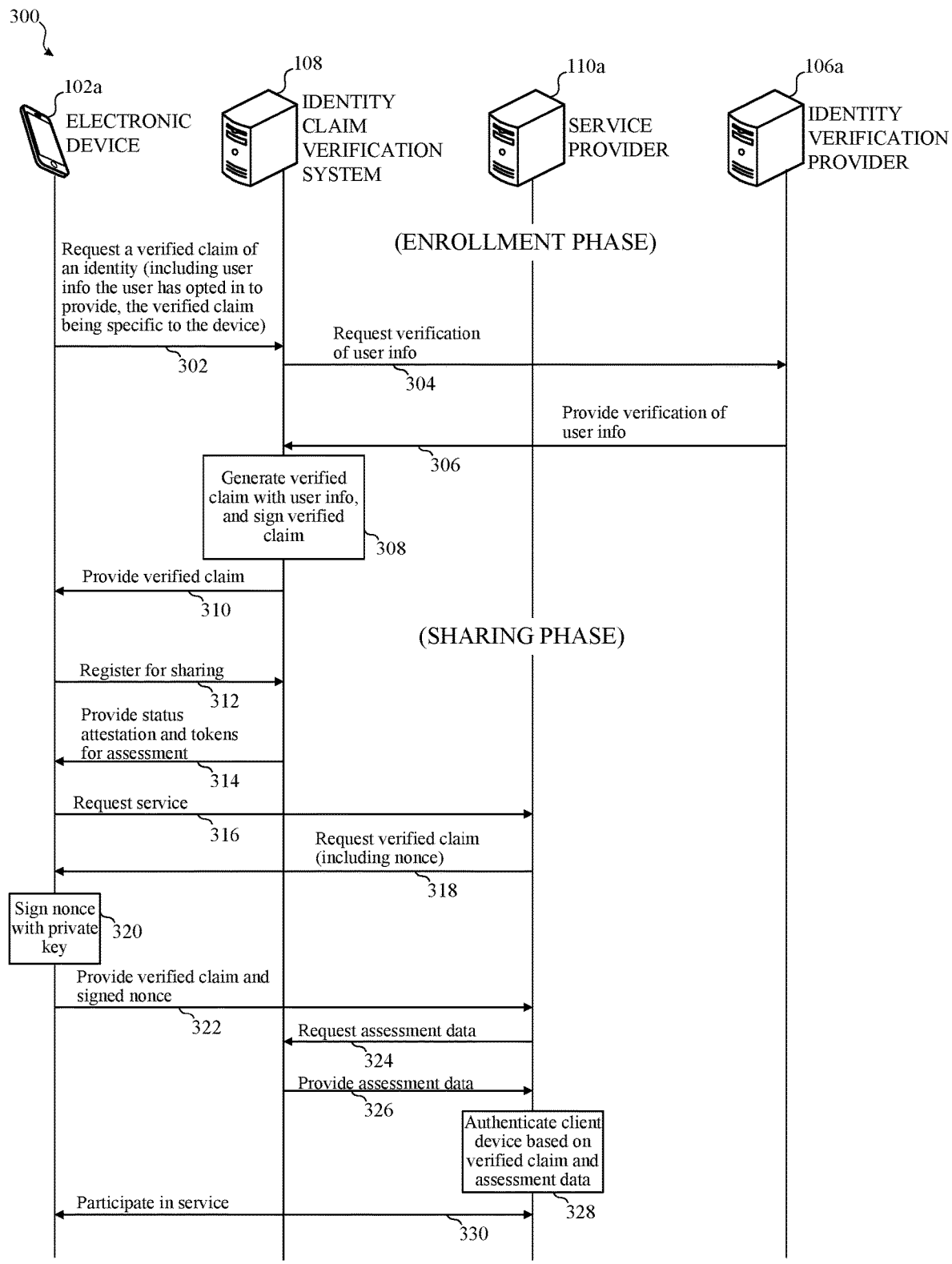
FIG. 3 illustrates an example process for enrolling for and/or sharing a verified claim of identity in accordance with one or more implementations.

FIG. 3 illustrates an example process for enrolling for and/or sharing a verified claim of identity in accordance with one or more implementations. For explanatory purposes, the process 300 is primarily described herein with reference to the electronic device 102*a*, the identity verification provider 106*a*, the identity claim verification system 108 and the service provider 110*a* of FIG. 1. However, the process 300 is not limited to the electronic device 102*a*, the identity verification provider 106*a*, the identity claim verification system 108 and the service provider 110*a* of FIG. 1, and one or more operations (or operations) of the process 300 may be performed by one or more other components and other suitable devices (e.g., any of the electronic devices 102*a*-102*d*, the identity verification providers 106*a*-106*n* and/or the service providers 110*a*-110*n*). Further for explanatory purposes, the operations of the process 300 are described herein as occurring in serial, or linearly. However, multiple operations of the process 300 may occur in parallel. In addition, the operations of the process 300 need not be performed in the order shown and/or one or more operations of the process 300 need not be performed and/or can be replaced by other operations.

The process 300 includes an enrollment phase (e.g., operations 302-310) and a sharing phase (e.g., operations 312-330). During the enrollment phase, the electronic device 102*a* enrolls for a verified claim of identity, which corresponds with having the verified claim of identity generated, signed and provided to the electronic device 102*a*. During the sharing phase, the user of the electronic device 102*a* may use the verified claim with respect to registering/onboarding with the service provider 110*a*.

With respect to the enrollment phase (e.g., operations 302-310), the electronic device 102*a* sends a request for a verified claim to the identity claim verification system 108 (302). The request provided by the electronic device 102*a* includes information to identify the user (e.g., personally identifiable information that the user has opted in to provide), and is specific to the electronic device 102*a*. For example, the request may be specific to the electronic device 102*a* by one or more of a hardware reference key (e.g., corresponding to a public key of a public-private key pair signed by a reference key of the secure hardware component 206), a software reference key, a hardware device identifier and/or a software device identifier. In one or more implementations, the personally identifiable information included with the request is input by the user at the electronic device 102*a*.

For example, the user of the electronic device 102*a* may request the verified claim of identity by selecting an option (e.g., to enroll for a digital identity) presented within a user interface displayed on the electronic device 102*a*. The option may be displayed by an application specifically directed to enrolling and/or maintaining a verified claim of identity, where the verified claim can be used to register and/or use services provided by the service provider 110*a* (and/or other service providers). Alternatively or in addition, the option may be displayed by applications corresponding to the services, where user selection of the option may re-direct the user to the application for enrolling and/or maintaining the verified claim of identity.

Figure 4:
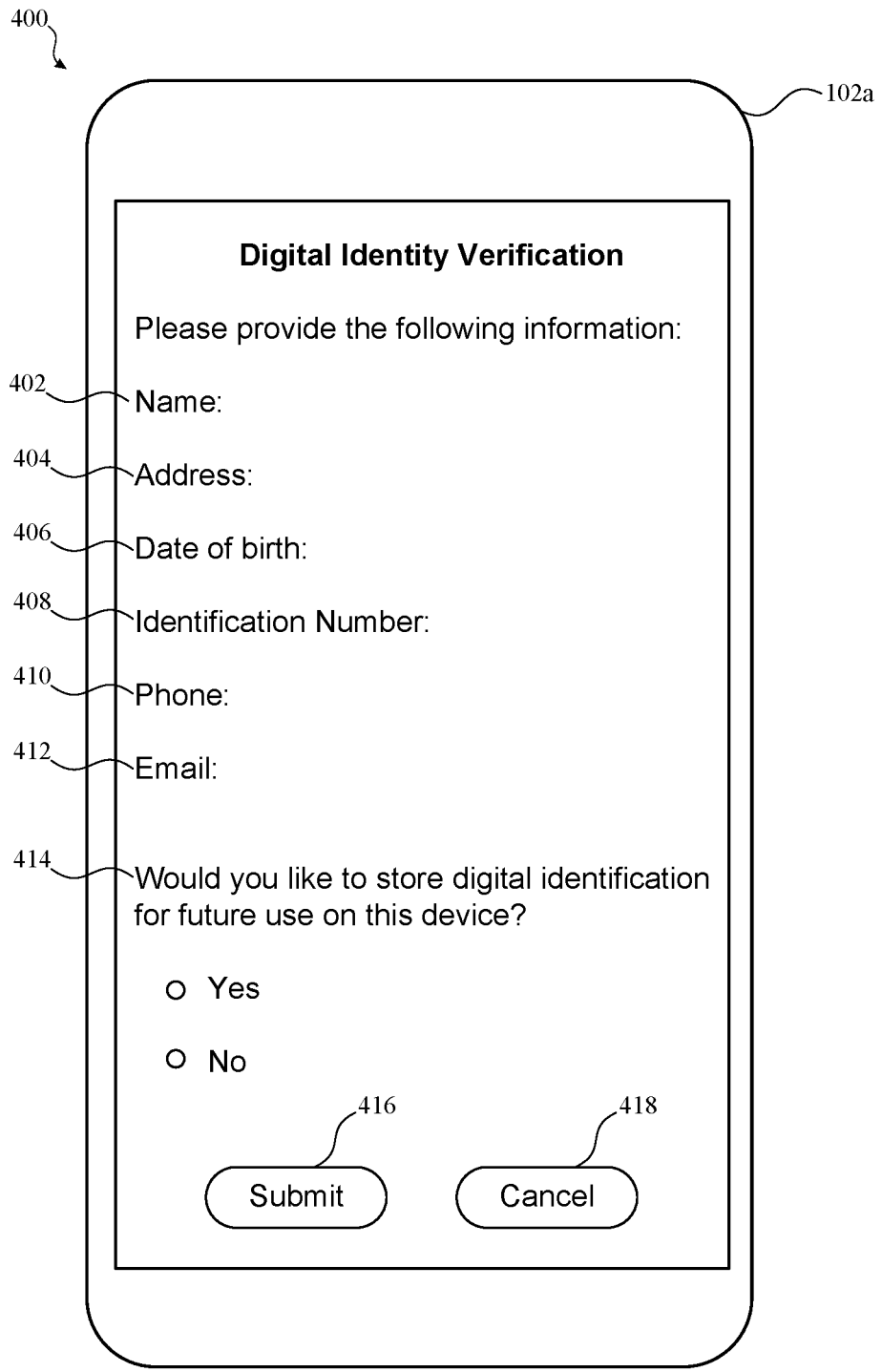
FIG. 4 illustrates an example user interface for enrolling for a verified claim of identity in accordance with one or more implementations.

Upon selecting the option to enroll for a verified claim, the user may be provided with an interface for providing the user information to create a verified claim. In this regard, FIG. 4 illustrates an example user interface 400 for digital identity verification in accordance with one or more implementations. As seen in FIG. 4, the user interface 400 includes multiple input fields 402-412 corresponding to personally-identifiable information. The one or more fields may include, but are not limited to, the user's: name 402, address 404, date of birth 406, identification number 408 (e.g., social security number), phone number 410, and email address 412. In one or more implementations, a verified claim may include image data such as an identifying picture of the user (e.g., as extracted from a physical identity document such as a driver's license, a passport, a university ID, a venue pass, a ski pass, a work ID or the like).

Upon filling out one or more of the fields 402-412, the user may select "yes" at option 414, and store a digital identification for future use (e.g., generate a request for a verified claim of identity) by clicking the submit button 416. After the user clicks the submit button 416, the electronic device 102*a* sends the request for the verified claim of identity to the identity claim verification system 108, based on the user information provided by the user within the fields 402-412. Alternatively, the user may cancel the enrollment process by clicking the cancel button 418.

As noted above, the request for the verified claim may also be specific to the electronic device 102*a* (e.g., by including a hardware reference key, software reference key, hardware device identifier and/or software device identifier). For example, the hardware/software reference key and/or hardware/software device identifier may be a public key of a public-private key pair generated by the electronic device (e.g., based on the secure hardware component 206, and being signed by a reference or master key of the secure hardware component 206). For example, the public-private key pair may be generated based at least in part on a device identifier (and/or other information) associated with, and/or stored on, the secure hardware component 206. The corresponding private key may be securely stored on the electronic device 102*a* (e.g., in the secure hardware component 206 or the memory 204) Moreover, the private key may be used to sign a nonce as discussed below with respect to operation 320.

The identity claim verification system 108 sends a request to the identity verification provider 106*a*, for the identity verification provider 106*a* to verify the user information provided by the electronic device 102*a* (304). For example, the identity verification provider 106*a* may correspond to a trusted service (e.g., system, organization or agency) that maintains identity information of users while providing user authentication services, for example, for the service providers 110*a*-110*n*.

Thus, the identity verification provider 106*a* verifies the user information provided by the electronic device 102*a*. For example, the identity verification provider 106*a* may confirm that the user information (e.g., name 402, address 404, date of birth 406, identification number 408, phone number 410, and email address 412) corresponds to a particular user, such as by checking against a database (e.g., an organization and/or agency database). After the verifying the user information, the identity verification provider 106*a* sends an indication of the verification to the identity claim verification system 108 (306).

In one or more implementations, the indication of the verification may correspond to the verified claim itself, where the identification verification provider 106*a* generates the verified claim, signs the verified claim and sends the verified claim to the identity claim verification system 108. Alternatively or in addition, the indication of the verification may simply correspond to a message/confirmation, from the identification provider 106*a* to the identity claim verification system 108, that the information identifying the user has been verified by the identity provider 106*a* (e.g., that user-input information such as name, address, date of birth matches and/or a recent image such as a selfie matches corresponding user information stored on an agency database).

In one or more implementations, more than one identity provider may be used to verify the user information. Thus, the identity claim verification system 108 may send respective requests to multiple identity verification provider(s). Each of the multiple identity verification provider(s) may verify fields of the user-provided information based on a check against a respective database (e.g., an organization and/or agency database). Each of the multiple identity verification provider(s) may send an indication of the verification to the identity claim verification system 108.

In response to receiving the indication(s), the identity claim verification system 108 generates a verified claim, based on the verified user information and on being specific to the electronic device 102*a* (e.g., by a hardware/software reference key and/or a hardware/software device identifier). The identity claim verification system 108 then signs the verified claim 308). In a case where multiple identity verification provider(s) verified the user information, the verified claim may correspond to a composite claim.

Thus, the verified claim corresponds to claim of identity for a user, which has been signed by the identity claim verification system 108 to indicate that the user information has been verified by at least one identity verification provider 106*a*. The verified claim is further to the specific electronic device 102*a*, such as specific to the secure hardware component 206 of the electronic device 102*a*. The identity claim verification system 108 then provides the signed verified claim to the electronic device 102*a* (310).

In one or more implementations, the user of the electronic device 102*a* may create multiple verified claims of identity. For example, a first type of verified claim may correspond to a digital version of a physical identity document, such as a driver's license, a passport, or the like (e.g., which may include image data such as an identifying image of the user). A second type of verified claim may correspond to a general digital certificate which stores information that identifies a user based on verified user information. A third type of verified claim may correspond to user information which has not been verified by an identity provider system, for example, if the user wishes to use a pseudo name in association with certain services (e.g., social networking, blogging). Another type of verified claim may correspond to a work (and/or school) alias (or identity) as opposed to a personal alias (or identity).

In one or more implementations, the user of the electronic device 102*a* may request to view a verified claim of identity. For example, the user may select an option, presented within a user interface displayed on the electronic device 102*a*, to view information related to the verified claim, and/or the information contained in the verified claim. The option may be displayed by the application that is directed to enrolling and/or maintaining verified claims of identity(s).

Figure 5:
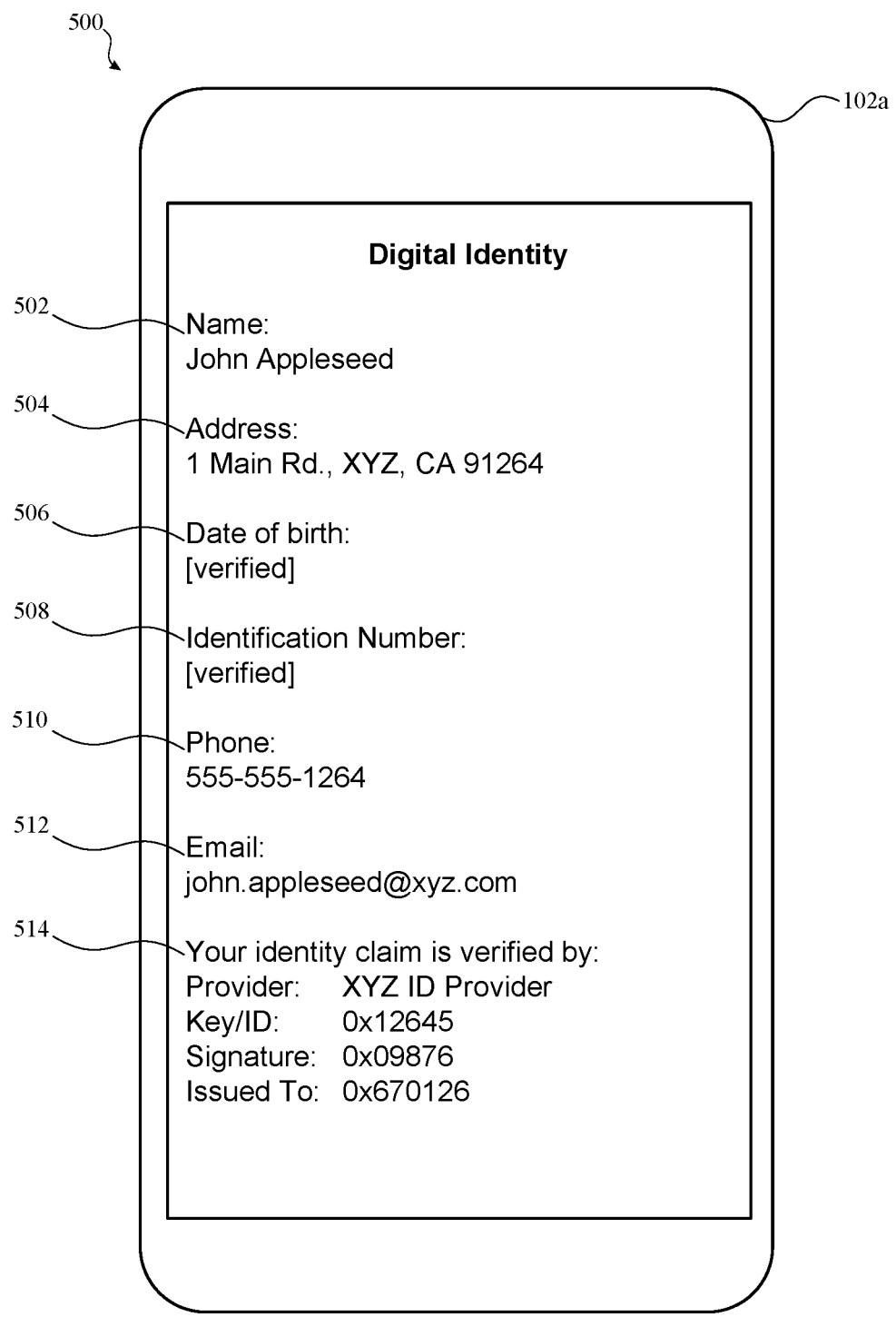
FIG. 5 illustrates an example user interface for displaying information of a verified claim of identity in accordance with one or more implementations.

Upon selecting the option, the user may be provided with the user interface 500 of FIG. 5, which is an example of personally-identifiable information that can be displayed with respect to a digital identity (e.g., a personal identity, a work identity, a social networking identity, or the like). In the example of FIG. 5, the user interface 500 includes display fields 502-514 corresponding to the verified claim. The one or more fields displayed in association with the verified claim may include, but are not limited to, the user's: name 502, address 504, date of birth 506, identification number 508 (e.g., social security number), phone number 510, and email address 512.

In addition, the display field 514 is a field (e.g., an optional field) which indicates the name of the identity verification provider(s) (e.g., the identity verification provider 106*a* and/or other identity verification provider(s) if the verified claim is a composite claim). The display field 514 further displays an indication of a key/identifier (e.g., the hardware/software reference key and/or the hardware/software identifier of the verified claim), a signature (e.g., as provided by the identity claim verification system 108), and an issued to field (e.g., which identifies the electronic device 102*a*).

In one or more implementations, certain display field(s) may simply indicate that the corresponding user information has been "verified" (e.g., by the identity verification provider 106*a*), so as to obscure private information of the user from being displayed and/or to prevent the private (verified) information of the user being transmitted to the service providers. In the example of FIG. 5, the user's date of birth 508 and identification number 510 are displayed as being verified, rather than displaying the actual values of these fields. The displaying of actual information as compared to information that has been "verified" may be based at least partially on the verified claim being implemented as a Merkle tree, which is discussed in further detail below with respect to FIG. 7. By using the Merkle tree, the electronic device 102*a* and/or the identity claim verification system may selectively determine which fields of the verified claim are provided for display and/or which fields of the verified claim are provided to the service providers.

As noted above, operations 312-330 may correspond to a sharing phase, in which the electronic device 102*a* may share the verified claim with a service provider, in association with registering and/or participating in service(s) provided by the service provider 110*a*.

At operation 312, the electronic device 102*a* registers for sharing (e.g., the verified claim) by sending a request to the identity claim verification system 108. For example, the request may include the verified claim with signature, and an indication of the service provider (e.g., 110*a*) for sharing the verified claim with. The identity claim verification system 108 provides an identity status attestation (e.g., discussed below with respect to FIGS. 9A-9D), together with token(s) for assessment, to the electronic device 102*a* (314). For example, the identity status attestation (e.g., corresponding to a certificate signed by the identity claim verification system 108) may attest or otherwise indicate that the verified claim is still valid (e.g., has not been revoked). Moreover, the token(s) for assessment may relate to device assessment data (e.g., based on a comparison between the plural data fields in the verified claim and corresponding data locally-stored on the device) and/or overall account assessment data (e.g., an overall account assessment service based on the plural data fields in the verified claim). In one or more implementations, the token(s) for assessment may correspond to unique identifiers for uniquely identifying a particular service provider (e.g., the service provider 110*a*) from among the service providers 110*a*-110*n*, as discussed further below with respect to operation 324. By virtue of using a token, the device assessment data and/or overall account assessment data for the user may be shared with the service provider 110*a* (e.g., and not shared with the other service providers 110*a*-110*n*), as discussed below with respect to operation 326.

The electronic device 102*a* sends a request for a service provided by the service provider 110*a* (316). There are multiple types of services that may be provided by service providers. Examples of such services include, but are not limited to: operating system services (e.g., a podcast app, a messaging app, a payment app, a health app, a developer app, a wallet app), third party services (e.g., a banking app, a travel app), agency-based services (e.g., a travel regulations agency, a law enforcement agency), social networking services (e.g., blogging, media, news), and/or generally any service.

Thus, the user of the electronic device 102*a* may invoke (e.g., or download and invoke, if the app is not already downloaded) an appropriate app on the electronic device 102*a* corresponding to the respective service. Alternatively or in addition, the user of the electronic device 102*a* may invoke a web browser on the electronic device 102*a*, and navigate to a website corresponding to the respective service.

Figure 6:
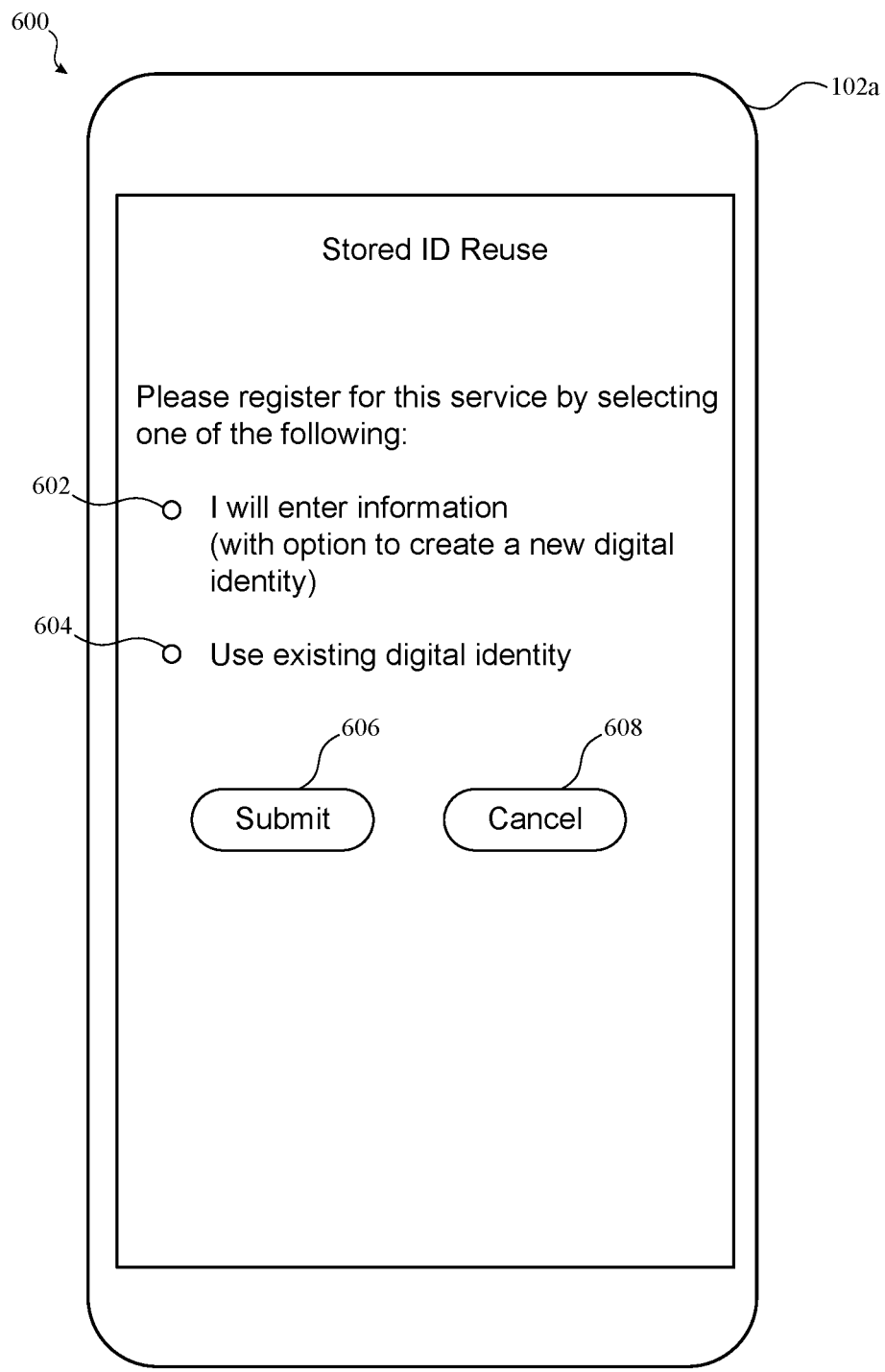
FIG. 6 illustrates an example user interface for registering with a service provider in accordance with one or more implementations.

In one or more implementations, the service provider 110*a* may require identity and verification to register/onboard users. The verification process may require the user to provide information (e.g., in the form of a verified claim) that identifies the user, before providing the user with a service. In this regard, FIG. 6 illustrates an example user interface 600 for registering with the service provider 110*a* in accordance with one or more implementations.

In one or more implementations, the user interface 600 includes two options for the user of the electronic device 102*a* to register for a service. The option 602 provides for registering the user with the service by requiring the user to user manually enter information to identify the user (e.g., name, address, phone number), based on the requirements of the service provider 110*a*. This process may require the service provider 110*a* to separately verify the entered information with the identity verification provider 106*a*, and also requires that the user provide private/sensitive data to the service provider (which could be subsequently exposed if the service provider experiences a data breach). On the other hand, the option 604 provides for verifying the user by using an existing verified claim of identity.

In a case where the user selects option 602 and clicks the submit button 606, the user may be provided with an interface for registering with the service provider 110*a*, or an interface for enrolling a digital identity independent of the service provider, such as the user interface 400. For example, the interface may require the user to input information that identifies the user (e.g., name, address, date of birth, phone). Upon completion of the service registration interface, the user may be provided with an option to request a verified claim based on the identifying information input by the user. For example, this may require verification of the input information by the service provider 110*a* (or verification of the input information by the subject system when the user is presented with the digital identity enrollment user interface 400). The user may then opt to have a verified claim of identity generated as part of user registration for a service.

In a case where the user selects option 604 and clicks the submit button 606, the user may be provided with an interface that lists the verified claim(s) of identity available to the user. As such, the user may select the appropriate claim of identity for registering with the service provider 110*a*. As noted above, it is possible for a user to have multiple claims of identity. For example, the user may have one or more claims of identity that have been verified (e.g., by the identity verification provider 106*a*) and signed (e.g., by the identity claim verification system 108), and/or one or more claims of identity that are not verified (e.g., corresponding to pseudo names of the user). The listed claim(s) of identity may display one or more fields of information to identify the user (e.g., the user's name, address, phone number), so that the user may select the appropriate claim of identity for the service.

Thus, in response to receiving the request for service (316), the service provider 110*a* sends a request for the verified claim to the electronic device 102*a* (318). The request for the verified claim may include a nonce. In one or more implementations, the nonce may correspond to a security measure (e.g., for reducing the likelihood of a replay attack). For example, when a digital signature is used to prove ownership of an asset (e.g., a verified claim), a nonce may be requested to verify such ownership. Thus, to prove ownership of claim, the electronic device 102*a* may be used to request the nonce, and the electronic device 102 may sign the nonce (e.g., using the private key) in order to prove ownership of the verified claim.

As such, in one or more implementations, the nonce provided by the service provider 110*a* to the electronic device 102*a* may be used to confirm the verified claim is specific to the electronic device 102*a*. The electronic device 102*a* signs the nonce with the private key (320), for example, as signed by a reference key of the secure hardware component 206 and stored in the secure hardware component 206 or the memory 204 of the electronic device 102*a*. The signed nonce indicates that the verified claim is specific to the electronic device 102*a* (e.g., as opposed to being tied to/specific to another device) as the public key corresponding to the private key is included in the verified claim. The electronic device 102*a* then sends the verified claim, together with the signed nonce, to the service provider 110*a* (322).

As noted above with respect to operation 314, the electronic device 102*a* may have received an identity status attestation from the identity claim verification system 108 (e.g., that the verified claim is still valid and has not been revoked), and token(s) for assessment data). In one or more implementations, operations 312-314 may occur after the electronic device 102*a* has signed the nonce at operation 320.

Prior to or in conjunction with operation 322, the electronic device 102*a* may provide the token(s) for assessment data to the service provider 110*a* (e.g., together with an indication of the identity status attestation). The service provider 110*a* may evaluate the assessment data associated with the tokens and/or the identity status attestation in determining whether to onboard and/or provide service to the user of the electronic device 102*a*. For example, the service provider 110*a* may deny the service in a case where the identity status attestation indicates that the verified claim is no longer valid (e.g., the verified claim has been revoked).

In addition, the service provider 110*a* may verify the verified claim based at least partially on the hardware/software reference key and/or hardware/software device identifier (e.g., public key) of the verified claim and the signed nonce (e.g., as signed with the private key, corresponding to a confirmation that the verified claim is specific to the electronic device 102*a*). For example, the service provider 110*a* can use the public key contained in the verified claim to confirm that the nonce has been signed with the corresponding private key (e.g., indicating the verified claim is specific to the electronic device 102*a*).

Operations 324-326 relate to the identity claim verification system 108 providing assessment data to the service provider 110*a* (e.g., corresponding with the token(s) provided by the electronic device 102*a*). In addition to the identity status attestation, the verified claim (e.g., as attested to by the electronic device 102*a*) and the signed nonce, the assessment data provides the service provider 110*a* with further information to determine whether to onboard and/or provide service to the user of the electronic device 102*a*. The assessment data stored by the identity claim verification system 108 may include confidence assessments provided by the electronic device 102*a*, assessments provided by the identity verification provider(s) 106*a*-106*n*, and/or assessments provided by an overall account assessment system (e.g., discussed below with reference to FIGS. 8 and 9A-9D).

In one or more implementations, the electronic device 102*a* may be configured to determine a confidence assessment for the verified claim, based on a comparison between the plural data fields in the verified claim and corresponding data locally-stored on the electronic device 102*a*. The electronic device 102*a* may have email content, message content, social networking content or third party application content that is locally stored, and that corresponds to the plural data fields (e.g., name, email address, address, phone number) in the verified claim.

For example, an email stored on the electronic device 102*a* may indicate one or more of the user's name, email address and/or phone number (e.g., as part of an email signature block). The electronic device 102*a* may be configured to extract this data from the email for comparison against the plural fields in the verified claim of identity. Similar data may be obtained from message content, social networking content or third party application content stored on the electronic device 102*a*. The electronic device 102*a* may determine a confidence assessment for the data fields of the verified claim based on the corresponding data obtained from the locally-stored content. For example, the electronic device 102*a* may determine a respective confidence assessment score for the appropriate data fields in the verified claim.

In addition to confidence assessments based on locally-stored personally identifiable information, the confidence assessments may be based on sensor data of the device. For example, one or more sensors on the device (e.g., GPS-based sensor, motion sensor, image sensor) may be used to detect movement of the device over time. If the electronic device 102*a* is being used by the user, a predefined threshold of movement may be expected. If the device sensors indicate that movement falls below this threshold, it is possible that the device is not being used by the user (e.g., and is instead requesting service in a fraudulent manner, such as a bot/simulation running in a data center). In such cases, it may not be desirable to provide service to the electronic device 102*a*.

In one or more implementations, the electronic device 102a may prompt the user for authorization before accessing the locally-stored content and/or sensor data for determining confidence assessments for the verified claim, and/or the user may opt-in to participate. The electronic device 102a may provide the confidence assessment to the identity claim verification system 108 for sending to the service provider 110a. Alternatively or in addition, the electronic device 102a may send the confidence assessments directly to the service provider 110a. For example, the electronic device 102a may send the confidence assessments together with the signed nonce and verified claim as part of operation 318.

The assessments based on local device data may be stored within a first response vector. For one or more fields of the verified claim, the first response vector may indicate confidence scores (e.g., as determined by the electronic device 102a) indicating a likelihood that the corresponding fields are accurate.

As noted above, assessments may also be provided by the identity verification provider 106a in conjunction with verifying the user information in the verified claim, for example, in the form of a second response vector. For one or more fields of the verified claim, the second response vector may indicate a confidence score (e.g., as determined by the identity verification provider 106a) indicating a likelihood that the corresponding field is accurate. Thus, the identity verification provider 106a may be configured to calculate a score for each of the data fields (e.g., name, address, email and the like) included in the verified claim. For example, the identity verification provider 106a may compare the plural data fields in the verified claim with values accessible by the identity verification provider 106a (e.g., from an agency database), and determine a respective score based on the comparisons. The respective scores may be included in the second response vector, which may be provided by the identity verification provider 106a to the identity claim verification system 108 for sending to the service provider 110a. Alternatively or in addition, the identity verification provider 106a may directly send the second response vector to the service provider 110a.

Moreover, an overall account assessment may be determined based on a larger ecosystem related to the electronic device 102a and/or the user. For example, the overall account assessment may relate to one or more of: a user's likelihood to pay (e.g., based on past payment history) and/or fraudulent activity associated with the user's account that can be attributed to the user.

Thus, the service provider 110a receives the identity status attestation, the verified claim with the signed nonce which ties the verified claim to the electronic device 102a (322). The service provider 110a may further receive assessment data (326), for example, provided that the token(s) for assessment data correspond to the service provider 110a. Based on the received information, the service provider 110a may determine whether or not to provide service to the electronic device 102a. In doing so, the service provider 110a may determine an overall confidence score indicating a likelihood that the plural data fields of the verified claim are accurate (e.g., based on one or more of the above-mentioned assessments), and providing service to the electronic device if the overall confidence score meets a predefined threshold.

In one or more implementations, the service provider 110a may determine that the verified claim and/or the assessment data are insufficient to identify the user for the requested service. For example, the verified claim may include fields which do not sufficiently identify the user, in view of the first response vector (e.g., based on local device data), the second response vector (e.g., agency data from the identity verification providers) and/or the overall account assessment. As such, the service provider 110a may prompt the user of the electronic device 102a for additional information to supplement the information provided with the verified claim. The user may enter this supplemental information and provide it to the service provider 110a, to re-evaluate whether to provide service to the electronic device 102a.

Once the service provider 110a determines that the provided information is sufficient (e.g., based on the verified claim, signed nonce, assessments and supplemental data input by the user, if any), the service provider 110a may authenticate the electronic device 102a (328). After being authenticated, the electronic device 102a may participate in the service provided by the service provider 110a (330).

In one or more implementations, the service provider 110a may provide the electronic device 102a with an identity certificate, after the electronic device 102a has been authenticated. The electronic device 102a may provide this identity certificate to the service provider 110a with respect to subsequent authentication with the service provider 110a (e.g., and thereby avoiding having to re-send the verified claim and signed nonce to the service provider 110a). In doing so, the electronic device 102a may require the user to authenticate via biometric recognition (e.g., on-device facial recognition, fingerprint recognition, iris recognition, signature recognition and/or the like) and/or user passcode entry, prior to sending the identity certificate to the service provider 110a.

In one or more implementations, a verified claim may be revoked. For example, the electronic device 102a may be indicated as being lost by the user (e.g., using a separate service for identifying lost devices). Alternatively or in addition, the electronic device 102a may present a user interface option permitting the user to cancel/revoke the verified claim, as part of the application specifically directed to enrolling and/or maintaining a verified claim of identity. The application may further include user interface options to display the contents of the verified claim (e.g., corresponding to the user interface 500) and/or to partially revoke the verified claim (e.g., where the user selects which data fields of the verified claim are to be revoked/deleted).

Thus, revocation of the verified claim may be based on the electronic device 102a being lost and/or the user explicitly requesting to (entirely or partially) revoke the verified claim. The identity claim verification system 108 may therefore receive a request to revoke the verified claim (e.g., from a "lost device" service and/or from the electronic device 102a).

In response to receiving the revocation request, the identity claim verification system 108 may send an instruction to the electronic device 102a to revoke the verified claim. The instruction to revoke the verified claim may include a request for the electronic device 102a to delete the verified claim itself (or appropriate fields of the verified claim, if the revocation is partial). As such, the electronic device 102a may no longer be able provide a verified claim in response to the service provider 110a requesting the verified claim.

Alternatively or in addition, the instruction to revoke the verified claim may include a request for the electronic device 102a to delete the private key stored on the electronic device 102a (e.g., in the secure hardware component 206 or the memory 204). Without the private key, the electronic device is unable to properly return a signed nonce to the service provider 110a. Thus, even if the verified claim were provided to the service provider 110a, service would be denied, or the service provider 110a would require supplemental information to be input by the user in order to register/use the service. In one or more implementations, the deletion of the private key may not occur if the user selected to revoke only part of the verified claim. Rather, the respective fields in the verified claim may just be removed.

In addition to deleting content relating to the verified claim on the electronic device 102a, content may be deleted from the identity claim verification system 108. This content may include, but is not limited to, a copy of the verified claim (e.g., an encrypted copy of the verified claim stored on the identity claim verification system 108) and/or the assessment data (e.g., first and second vectors, overall account assessment) related to the verified claim.

Moreover, the identity claim verification system 108 may maintain a list of verified claims that have been revoked (e.g., spanning multiple devices and multiple users). As part of the revocation process, the identity claim verification system 108 may update the revocation list to include the verified claim for which revocation was requested. The revocation of the verified claim may be relayed to the service provider 110a, for example, in response to a status request from the service provider 110a. Alternatively or in addition, updates to the revocation list may be sent from the identity claim verification system 108 to the service providers 110a-110n, such that the service providers 110a-110n may check the revocation list before providing service with respect to a verified claim.

In one or more implementations, the identity verification provider 106a and/or the service provider 110a may be configured to communicate (e.g., via messaging) in an authenticated and secure way with the electronic device 102a after successful enrollment. However, some methods for providing such communication may expose the platform identity of the user with the identity verification provider 106a or the service provider 110a. To avoid and/or reduce revealing the platform identity, an elliptic-curve cryptography key pair may be generated in AP. Using Diffie-Hellman key exchange (DH) and a public key of the service provider 110a, an Advanced Encryption Standard (AES) key can be generated, a message can be signed with the private key in the secure hardware component 206. Thus, the AES and elliptic-curve cryptography (ECC) key pair may be used to encrypt and sign messages between the electronic device 102a and the service provider 110a. Communication between the electronic device 102a and the identity verification provider 106a may be provided for in a similar manner.

Figure 7:
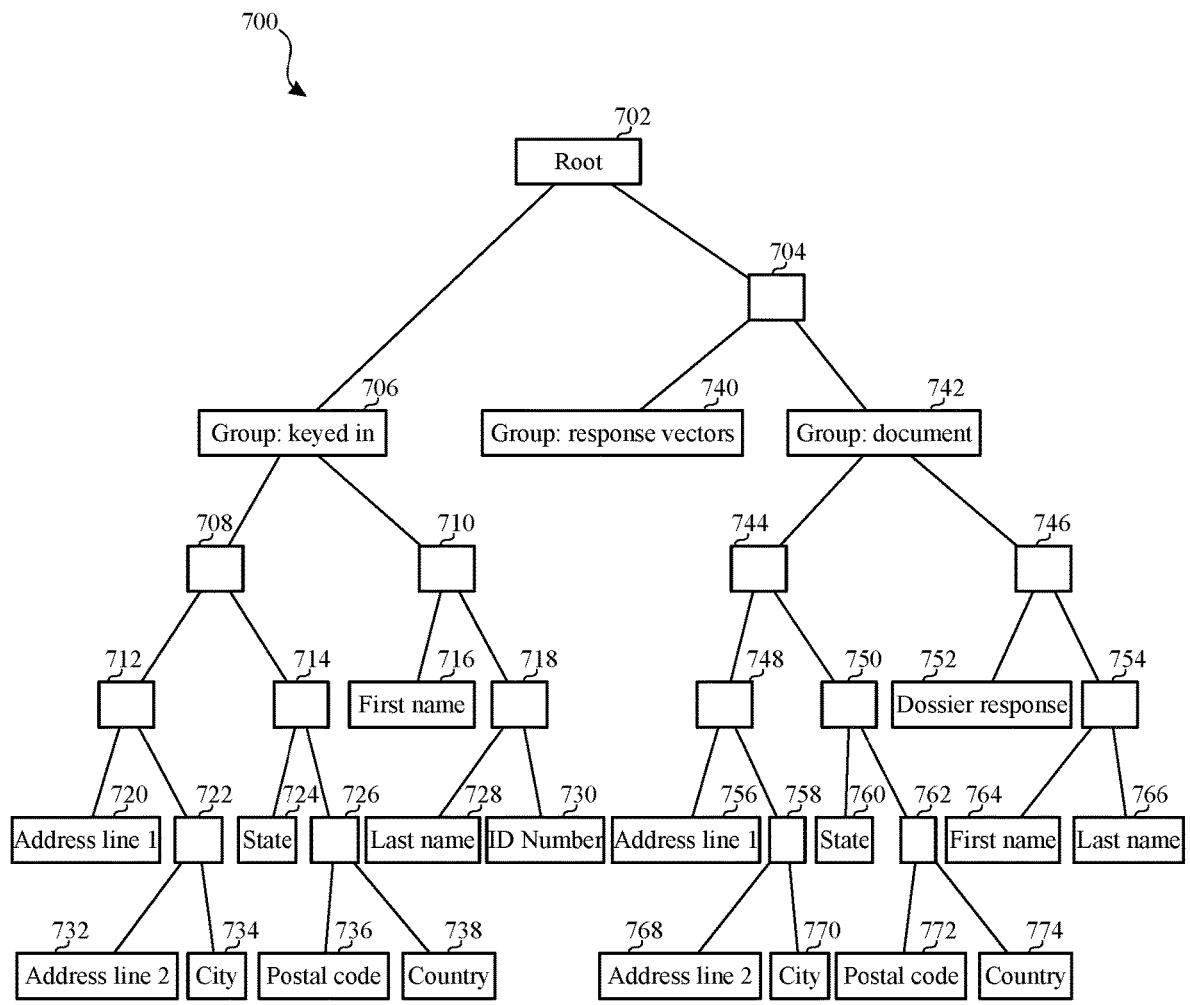
FIG. 7 illustrates an example of storing user identity information of a verified claim in a Merkle tree in accordance with one or more implementations.

As noted above, a verified claim may be implemented as a Merkle tree for selective sharing of data fields. FIG. 7 illustrates an example of a verified claim implemented as a Merkle tree in accordance with one or more implementations.

As described above, a verified claim of identity may include multiple data fields for identifying a user, such as first name, last name, date of birth, identification number (e.g., social security number), and the like. However, some service providers may not require all of the data fields in order to register a user for service. Thus, the information included in a verified claim may be over-inclusive for some service providers, thereby unnecessarily exposing portions of the user's private/sensitive data to the service provider.

In one or more implementations, the Merkle tree 700 stores the personally-identifiable information of the verified claim. The Merkle tree 700 is configured such that the electronic device (e.g., 102a) can select which of the multiple fields to send in response to a request, from a service provider (e.g., 110a), for information to identify the user, and the verified claim is filtered accordingly. In this manner, only the requested information is sent to the service provider 110a.

In the example of FIG. 7, the Merkle tree 700 includes a root node 702, as well as other nodes 704-774. Nodes 706, 740 and 742 represent group nodes for accessing user information in respective child nodes. For example, group node 706 provides for selection of data fields corresponding to user information that was manually entered by the user. The selectable child nodes 708-738 for the group node 706 include, but are not limited to a user's: first name 716, first line of an address 720, state 724, last name 728, ID number 730 (e.g., social security number), second line of an address 732, city 734, postal code 736 and country 738.

In another example, the group node 740 may include response vector information. As noted above, the response vector information may include, for each of the data fields of a verified claim, a confidence score indicating a likelihood that the field is accurate. The Merkle tree may account for separate response vectors based on local device data and/or agency data from the identity verification providers. In one or more implementations, the group node 740 may have child nodes (not shown) for selecting the respective confidence scores. In one or more implementations, the group node 742 provides for selection of data fields corresponding to user information that was obtained from a document identifying a user (e.g., a driver's license, passport, library card, or the like). The selectable child nodes 744-774 for the group node 742 may include a dossier response 752, corresponding to a document that is the output of a document verification process (e.g., by an identity verification provider such as an agency that issued the identifying document). In addition, the selectable child nodes may include, but are not limited to, the user's: first line of an address 756, state 760, first name 764, last name 766, second line of an address 768, city 770, postal code 772 and country 774.

As noted above, the identity claim verification system 108 may share only subsets of the data fields within the Merkle tree 700, for example, by performing amputations on the appropriate branches and/or nodes of the Merkle tree 700. Alternatively or in addition, the user of the electronic device 102a which stores the verified claim (e.g., in the form of the Merkle tree 700) may select which fields of the Merkle tree 700 to share with the service provider 110a. The user can select/de-select which fields to share and preserve cryptographic properties of the fields that are being shared.

Figure 8:
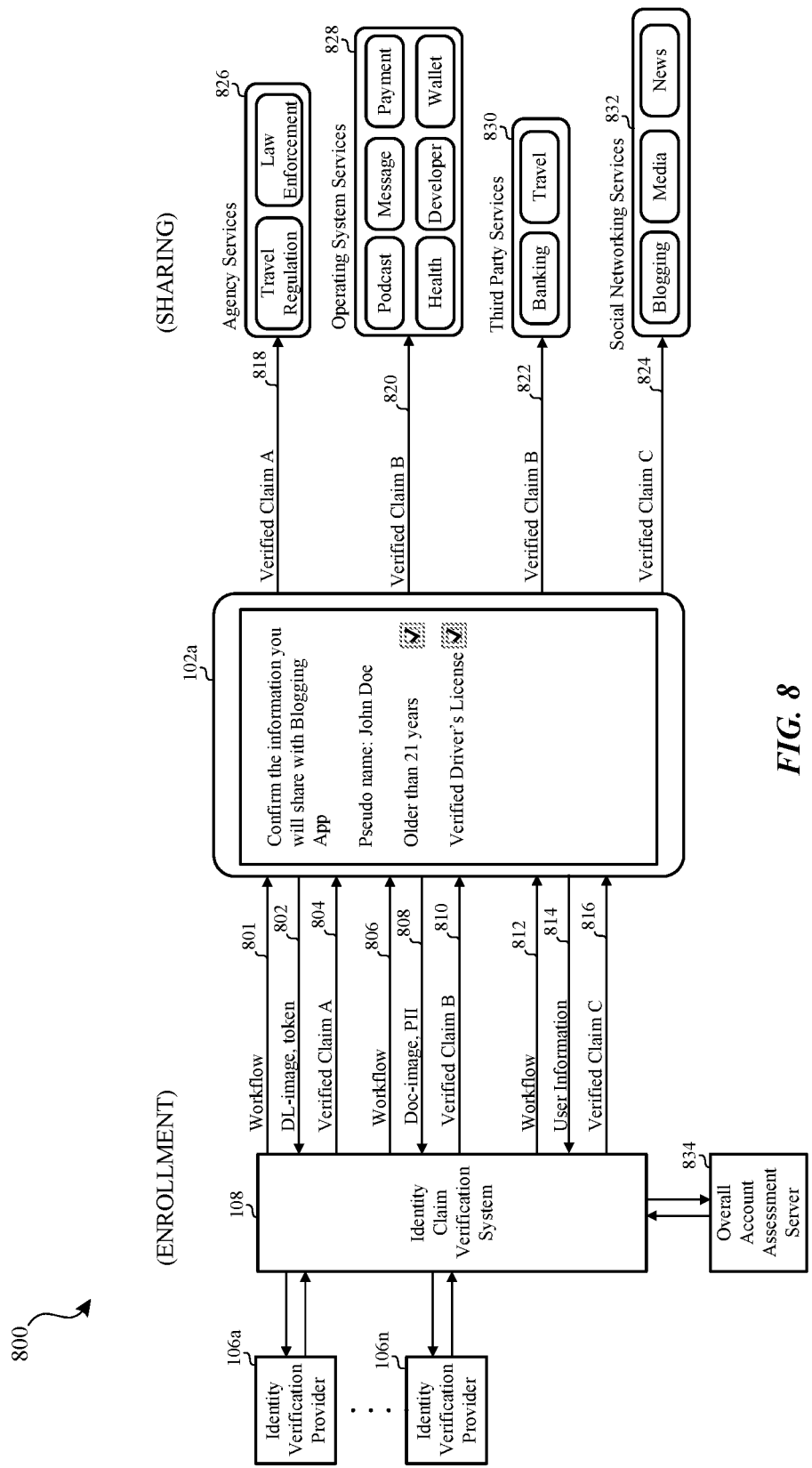
FIG. 8 illustrates examples of enrollment and sharing a verified claim of identity in accordance with one or more implementations.

FIG. 8 illustrates examples of enrollment and sharing a verified claim of identity in accordance with one or more implementations. For explanatory purposes, FIG. 8 is primarily described herein with reference to the electronic device 102a, the identity claim verification system 108, the identity verification providers 106a-106n and an overall account assessment server 834. However, FIG. 8 may correspond to one or more other components and other suitable devices. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

As shown in FIG. 8, the electronic device 102a may register and/or participate in one or more services 826-832 using a verified claim. Examples of agency services 826

(e.g., government) include but are not limited to: a travel regulations agency service and/or a law enforcement agency service. Examples of operating system services 828 (e.g., which have a server-based component) include, but are not limited to: a podcast app, a messaging app, a payment app, a health app (e.g., for a user to provide identity at a hospital and/or view personal health records), a developer app and/or a wallet app (e.g., which provides for extending credit via the operating system). Examples of third party services 830 include but are not limited to: a banking app and/or a travel app. Examples of social networking services 832 include but are not limited to: blogging, media and/or news apps.

In one or more implementations, different types of verified claims may be used with respect to registering for different services (e.g., services 826-832). As noted above, the electronic device 102a may store different types of verified claims. For example, different types of verified claims may correspond to one or more of a digital version of a physical identity document (e.g., a driver's license, a passport), a general digital certificate storing identifying information that has been verified, and/or a digital certificate storing identifying information which has not been verified (e.g., corresponding to a pseudo name). As noted above, the verified claim is a claim that information, provided by a user for identifying the user, has been verified (e.g., signed by the identity claim verification system 108 based on verification of the information contained in the claim by the identity verification provider 106a).

In the example of FIG. 8, operations 801-804 represent a verified claim (e.g., "verified claim A") corresponding to a digital version of a physical identity document. Thus, at operation 801, the identity claim verification system 108 may provide a workflow with user interfaces (e.g., prompts, data fields, and the like) for the user to provide personal information. The workflow may further specify any biometric authentication requirements (e.g., on-device facial recognition, fingerprint recognition, iris recognition, signature recognition and/or the like). At operation 802, the electronic device 102a may provide image data of a physical ID together with a token to the identity claim verification system 108. The identity claim verification system 108 may provide this data to one or more of the appropriate identity verification providers 106a-106n, which may verify the image data. For example, the identity verification provider 106a (e.g., corresponding to an issuer of the physical identity document) may perform optical character recognition on the information printed on the physical identity document and compare that information against information in an agency database. The identity verification provider 106a may further authenticate known security features on the ID (e.g., watermarks, textures, engravings, holograms) based on the image data.

Upon verification, the identity claim verification system 108 may generate and sign the verified claim A, and provide the verified claim A to the electronic device 102a at operation 804. At operation 818, the verified claim A (e.g., corresponding to a digital version of a physical identity document) may be provided to one or more of the agency services 826 (e.g., travel regulation, law enforcement) to prove user identity. The verified claim A may be implemented as a Merkle tree, such that only requested information (e.g., as required by the respective service provider(s)) is sent to the service provider(s).

In another example, operations 806-810 represent a verified claim (e.g., "verified claim B") corresponding to a general digital certificate storing identifying information that has been verified by one or more of the identity providers 106a-106n. Thus, at operation 806, the identity claim verification system 108 may provide a workflow with user interfaces (e.g., prompts, data fields, and the like) for the user to input personally-identifiable information and/or any biometric authentication requirements. The user may input this information at the electronic device 102a, which in turn sends the user information (e.g., which may include images, such images of a recent utility bill and/or other verifying document(s)) to the identity claim verification system 108 at operation 808. The identity claim verification system 108 may provide this data to one or more of the appropriate identity verification providers 106a-106n, for verification of the information.

Upon verification, the identity claim verification system 108 may generate and sign the verified claim B, and provide the verified claim B to the electronic device 102a at operation 810. At operation 820, the verified claim B may be provided to one or more of the operating system services 828, for example, in association with registering for one or more of the respective services (e.g., podcast, messaging, payment, health, developer, wallet). Alternatively or in addition, at operation 822, the verified claim B may be provided to one or more of the third party services 830, for example, in association with registering for one or more of the respective services (e.g., banking, travel). The verified claim B may be implemented as a Merkle tree, such that only requested information (e.g., as required by the respective service provider(s)) is sent to the service provider(s).

In one or more implementations, the verified claim B and its corresponding workflow may account for developer relations between different regions (e.g., countries). In this regard, identity providers may be country specific, such that the information required to legally identify a user may vary between countries. Thus, the use of verified claims as described herein may be beneficial in onboarding users for services provided by and/or across different countries, for example, with respect to operating system services 828.

Moreover, the workflow may specify communication protocols by which transmission of the verified claim is permitted between the electronic device 102a and the service provider 110a. For example, with respect to point of sale systems corresponding to service providers, the workflow may specify that one or more of near-field communication (NFC) or a QR code is permitted for providing a verified claim to the service provider 110a. The workflow may be country-specific, where some countries permit NFC and disallow a QR code for the verified claim, and other countries disallow NFC and permit a QR code for the verified claim.

In another example, operations 812-816 represent a verified claim (e.g., "verified claim C") corresponding to a digital certificate storing identifying information which has not been verified by the identity providers 106a-106. Thus, at operation 812, the identity claim verification system 108 may provide a workflow with user interfaces (e.g., prompts, data fields, and the like) for the user to input user information (e.g., a pseudo name, email address) and/or any biometric authentication requirements. The user may input this information at the electronic device 102a, which in turn sends the information to the identity claim verification system 108 at operation 814. In one or more implementations, the identity claim verification system 108 may verify that the information corresponds to a real person (e.g., as opposed to a bot), without having further verification performed by the identity providers 106a-106n.

Upon verification, the identity claim verification system 108 may generate the verified claim C, and provide the verified claim C to the electronic device 102a at operation 816. At operation 824, the verified claim C may be provided to one or more of the social networking services 832, for example, in association with registering for one or more of the respective services (e.g., blogging, media, news). The verified claim C may be implemented as a Merkle tree, such that only requested information (e.g., as required by the respective service provider(s)) is sent to the service provider (s).

As shown in FIG. 8, the identity claim verification system may also communicate with the overall account assessment server 834. For example, the overall account assessment server 834 may be configured to provide assessments that relate to an overall assessment of the user account associated with the electronic device 102a. Moreover, the overall account assessments may relate to agency data accessible by the identity verification providers 106a-106n. As described herein, service providers (e.g., corresponding to the agency services 826, the operating system services 828, the third party services 830 and/or the social networking services 832) may use assessment data (e.g., including the overall account assessment as data provided by the overall account assessment server 834 and/or other assessment data) in determining whether to provide service to the electronic device 102a.

Thus, FIG. 8 illustrates an example of a user having multiple verified claims (e.g., verified claims A to C) which may be stored on the electronic device 102a and used in association with different types of services and/or user accounts. Alternatively or in addition, it is possible for multiple users to have respective verified claims on a shared device (e.g., the electronic device 102a). Each of the respective verified claims may be specific to the electronic device 102a (e.g., via hardware/software reference key(s) and/or hardware/software device identifier(s)). In one or more implementations, the different users may be required to authenticate via biometric recognition (e.g., on-device facial recognition or fingerprint recognition) and/or user passcode entry in order to access and/or share their respective verified claim (e.g., where the biometric and/or passcode recognition is used to identify the respective verified claim).

FIGS. 9A-9D illustrate another process for enrolling for and/or sharing a verified claim of identity in accordance with one or more implementations. For explanatory purposes, the process 900 (e.g., spanning FIGS. 9A-9D) is primarily described herein with reference to an application 902, an identity claim verification client 904, the secure hardware component 206, a device confidence assessment client 906, an identity claim verification system 108, a device confidence assessment server 908, the overall account assessment server 834, the service provider 110a and the identity verification provider 106a. However, the process 900 is not limited to the application 902, the identity claim verification client 904, the identity claim verification system 108, the device confidence assessment server 908, the overall account assessment server 834, the service provider 110a and the identity verification provider 106a, and one or more operations (or operations) of the process 900 may be performed by one or more other components and other suitable devices. Further for explanatory purposes, the operations of the process 900 are described herein as occurring in serial, or linearly. However, multiple operations of the process 900 may occur in parallel. In addition, the operations of the process 900 need not be performed in the order shown and/or one or more operations of the process 900 need not be performed and/or can be replaced by other operations.

In one or more implementations, the application 902, the identity claim verification client 904, and the device confidence assessment client 906 may reside on the electronic device (e.g., the electronic device 102a), for example, as part of the operating system of the electronic device 102a. The identity claim verification system 108 may have a corresponding client component, for example, the identity claim verification client 904. In addition, the device confidence assessment server 908 and overall account assessment server 802 may correspond to separate servers.

In the example process 900, an application 902 is used with a service provided by the service provider 110a. It is possible for the process 900 to apply to different types of service, for example, but not limited to, payment services, operating system services, third party services, agency services and/or social networking services.

As discussed below with reference to FIGS. 9A-9D, the process 900 may include one or more attestations (e.g., verifications) with respect to the verified claim. For example, a first attestation may correspond with a reference key (e.g., a master key) of the secure hardware component 206 being used to generate a private-public key pair (e.g., discussed below with respect to operation 4), where the corresponding public key is signed by the reference key and provided to the identity claim verification system 108. In addition, a second attestation may correspond with the identity claim verification system 108 generating/signing a certificate (e.g., an X-509 certificate) for the verified claim, based on the public key, to attest that the electronic device 102a came from a particular manufacturer (e.g., discussed below with respect to operation 14). Moreover, a third attestation may correspond with the identity claim verification system 108 verifying that the previously generated and signed verified claim is still valid (e.g., has not been revoked due to the device being lost or due to fraudulent activity). In this regard, the identity claim verification system 108 may sign another certificate, thereby indicating the current valid state of the verified claim (e.g., discussed below with respect to operation 33).

Figure 9A:
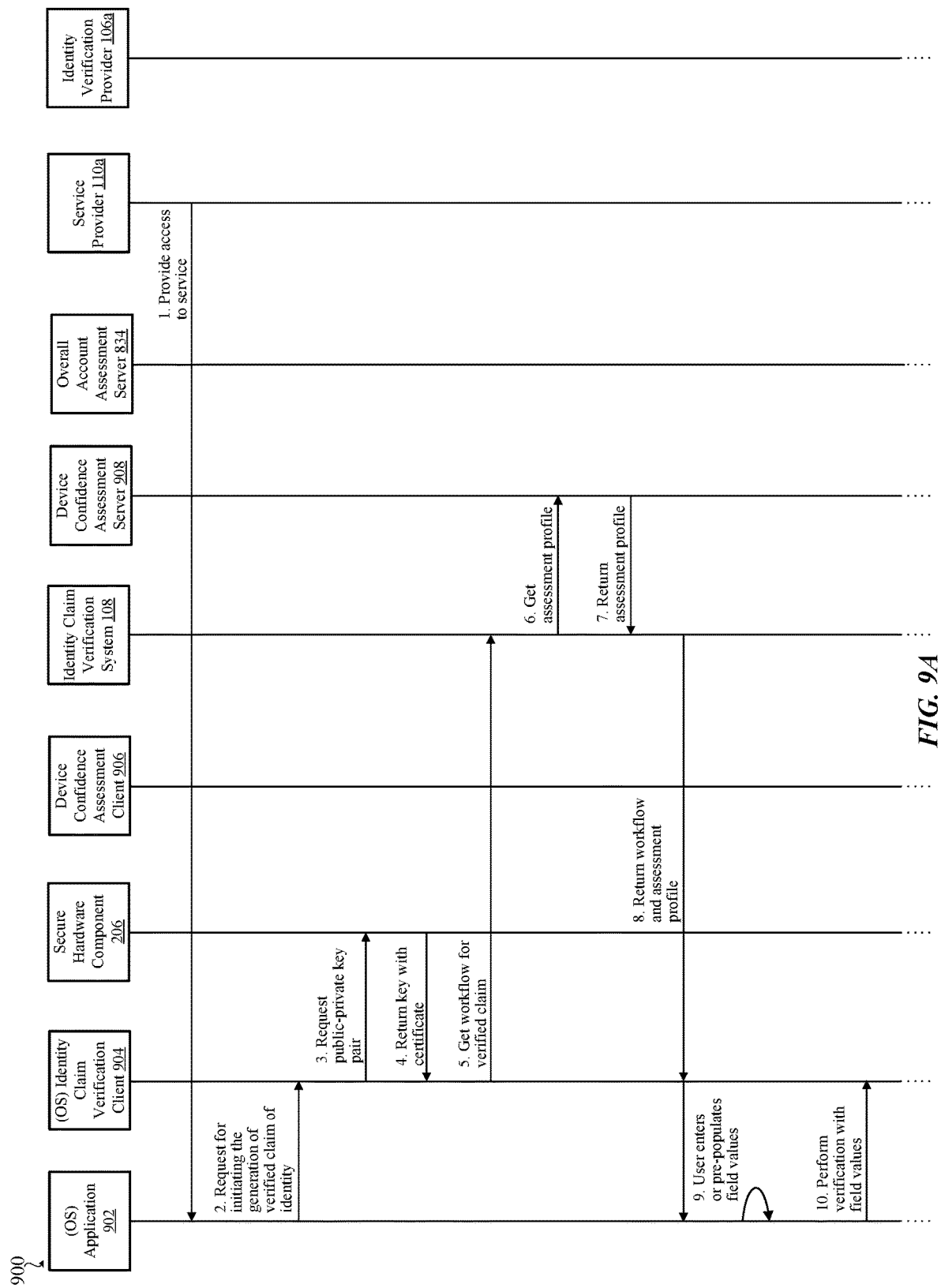
FIGS. 9A-9D illustrate another process for enrolling for and/or sharing a verified claim of identity in accordance with one or more implementations.

Turning to FIG. 9A, operation 1 may occur after a user at the electronic device 102a starts the application 902. In operation 1, the service provider 110a provides the application 902 with initial access to the service, so that the user may provide user information to identify the user.

At operation 2, the application 902 sends a request to the identity claim verification client 904, to initiate the generation of a verified claim of identity. At operation 3, the identity claim verification client 904 sends a request to create a public-private key pair, for example, where the corresponding private key is to be stored on the electronic device 102a (e.g., on the secure hardware component 206 or in the memory 204). As noted above, the secure hardware component 206 may be optional in one or more implementations. For example, it is possible for the verified claim to be specific to the electronic device 102a in various manners. For example, a hardware reference key that references the device, a software reference key that references the device, a hardware device identifier and/or a software device identifier may be used.

In the example of FIG. 9A, at operation 4, the secure hardware component 206 may use a hardware specific reference key to generate a private-public key pair, sign the corresponding public key with the reference key and present to a server (108 or any other such service) who can issue a digital certificate. As noted above, such signing by the secure hardware component 206 may correspond to a first attestation, which attests that certificate and/or the returned key pair was generated on the electronic device 102a and is specific to the device.

At operation 5, the identity claim verification client 904 sends a request to the identity claim verification system 108 for a workflow for the verified claim. As noted above, the workflow may be a service which specifies user interfaces (e.g., prompts, data fields, and the like) for the user to provide personally-identifiable information, and any biometric authentication requirements and/or other instructions for onboarding a user with a service.

In one or more implementations, the workflow may be specific to a service provider (e.g., the service provider 110a), such that different service providers have different workflows for onboarding a user. Thus, the identity claim verification system 108 may be configured to store different workflows from different service providers, update the stored workflows and/or may request workflows (e.g., from respective service providers).

At operation 6, the identity claim verification system 108 requests, from the device confidence assessment server 908, an assessment profile for assessing the verified claim.

The device confidence assessment server 908 generates the assessment profile for assessing a verified claim. For example, the assessment profile may indicate to compare information of a verified claim against information on a device (e.g., device confidence assessment).

In one or more implementations, the assessment profile may be used to estimate whether the personally identifiable information for a user is sufficient with respect to providing service for different service providers. For example, a first type of service provide may only require minimal identifying information (e.g., a name and phone number) in order to onboard a user, whereas a second type of service provide may have more stringent requirements (e.g., additional identifying information such as a photo, identification number, addresses and the like). The assessment profile maybe used to determine the different requirements for different service providers and/or compare those requirements against identifying information for different users.

In one or more implementations, the assessment profile may be implemented as a model (e.g., a machine learning model, a neural network and/or the like) that is generated by a server (e.g., the identity claim verification system 108) and provided to a device (e.g., the electronic device 102a). For example, the model may have been trained (e.g., on a server) using different data sets of user information across different types of service providers, in order to determine whether identifying information for a particular user is sufficient to onboard that user for a particular service. Thus, the model may be locally stored on the device (e.g., in the memory 204) and configured to output scores (e.g., confidence scores) for different data fields corresponding to the identifying information of the user. Thus, the device confidence assessment server 908 provides the assessment profile to the identity claim verification client 904 at operation 7.

At operation 8, a workflow and the assessment profile are passed to the identity claim verification client 904 and/or the application 902. The user inputs the user information (e.g., by entering values or pre-populating values) associated with creating a verified claim at operation 9. For example, the user may provide input for the data fields shown in the user interface 400 of FIG. 4. At operation 10, the application 302 requests the identity claim verification client 904 to perform verification of the field values.

Figure 9B:
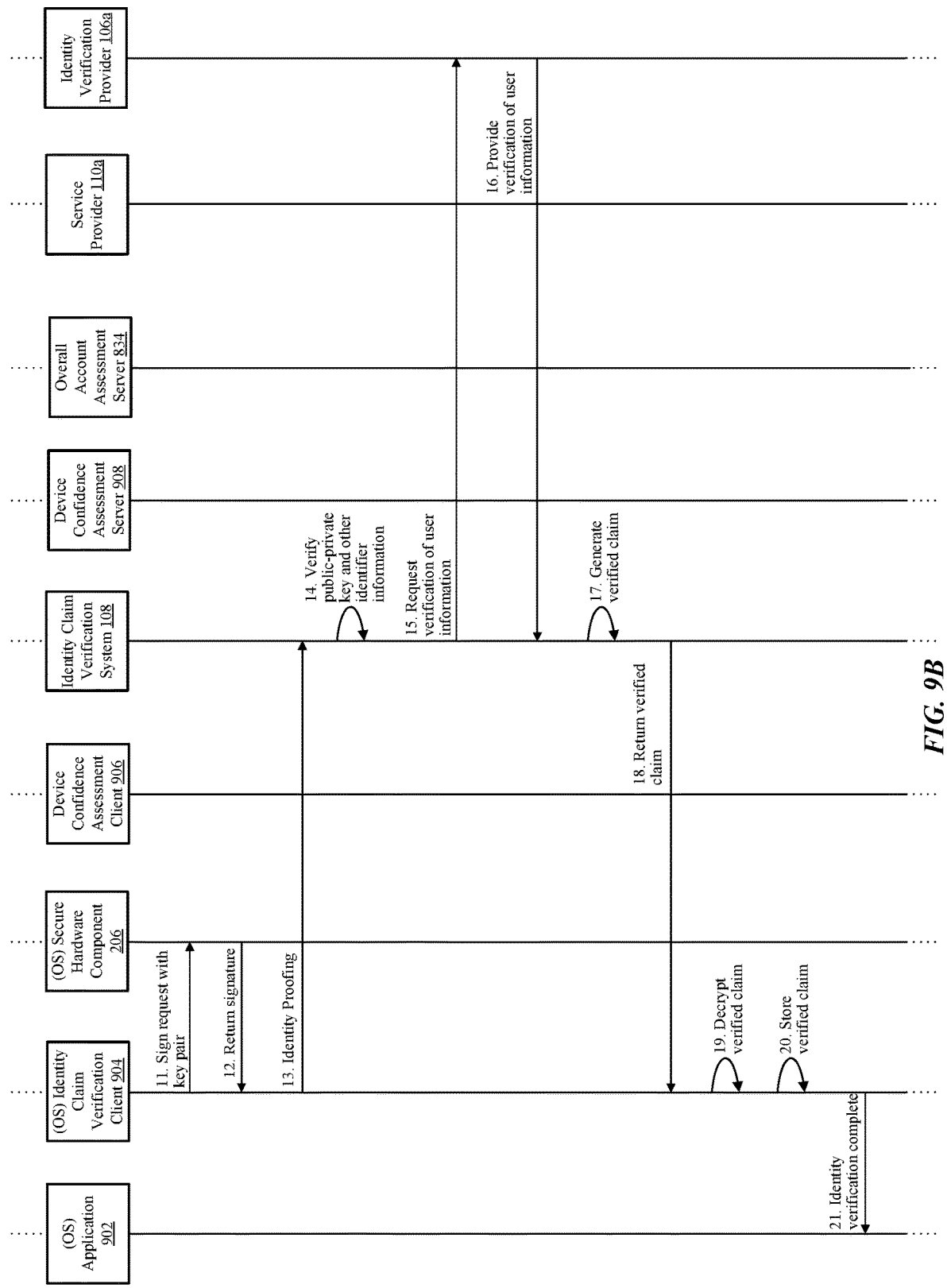

Turning to FIG. 9B, at operations 11-12, the identity claim verification client 904 requests and receives (e.g., from the secure hardware component 206) a signature based on the public-private key pair associated with the secure hardware component 206. (e.g., where the public-private key pair was generated based on a reference key of the secure hardware component 206). At operation 13, the identity claim verification client 904 requests identity proofing (e.g., for the workflow data) from the identity claim verification system 108. For example, the identity proofing may correspond with the enrollment phase described above with respect to FIG. 3.

The identity claim verification system 108 verifies the public-private key as well as other identifier information (e.g., key pairs) associated with the electronic device 102a at operation 14. As noted above, operation 14 may correspond with a second attestation, in which the identity claim verification system 108 signs the corresponding public key (e.g., as previously signed by the reference key of the secure hardware component of the electronic device 102a in association with the first attestation). The signing of the public key by the identity claim verification system 108 may correspond with an attestation that the electronic device 102a is a valid type of device configured for verified claims (e.g., the electronic device 102 is a device from a particular and/or trusted manufacturer, but without specifically identifying the electronic device 102). The identity claim verification system 108 may include the public key within a signed identity certificate (e.g., discussed with respect to operation 17).

At operation 15, the identity client verification system 108 sends a request to the identity verification provider 106a, for verification of the user information (e.g., the field values input by the user). At operation 16, the identity verification provider 106a provides verification of the user information. For example, the verification of the user information may correspond to the verified claim of user identity.

Operation 17 relates to the identity claim verification system 108 generating and signing for the verified claim, for example, based on the verification of the information by the identity verification provider 106a. As noted above, the verified claim may include a claim header to identify the verified claim, and a Merkle tree which includes the identifying information for the user. The verified claim may correspond to a data blob (e.g., containing the identifying information for the user in the form of the Merkle tree), and the identity claim verification system 108 may further sign and return an identity certificate (e.g., an x509 certificate). The identity certificate may include the public key (e.g., as signed with respect to operation 14). As such, the public key generated within the secure hardware component 206 of the electronic device 102a may be included as part of certificate issued by identity claim verification system 108.

Thus, the verified claim, which includes information for identifying the user, may be provided with an attestation (e.g., the second attestation) by the identity claim verification system 108 that the electronic device is a valid type of device, where the information for identifying the user has been verified by the identity verification provider 106a.

In one or more implementations, the identity claim verification system 108 may store the verified claim in an encrypted container, and send the verified claim to the identity claim verification client 904 of the electronic device 102a at operation 18. At operations 19-20, the identity claim verification client 904 locally decrypts and stores the verified claim in memory (e.g., in the memory 204). At operation 21, the identity claim verification client 904 sends an indication to the application 902 that the identity verification is complete (e.g., corresponding to a completion of the enrollment phase).

Figure 9C:
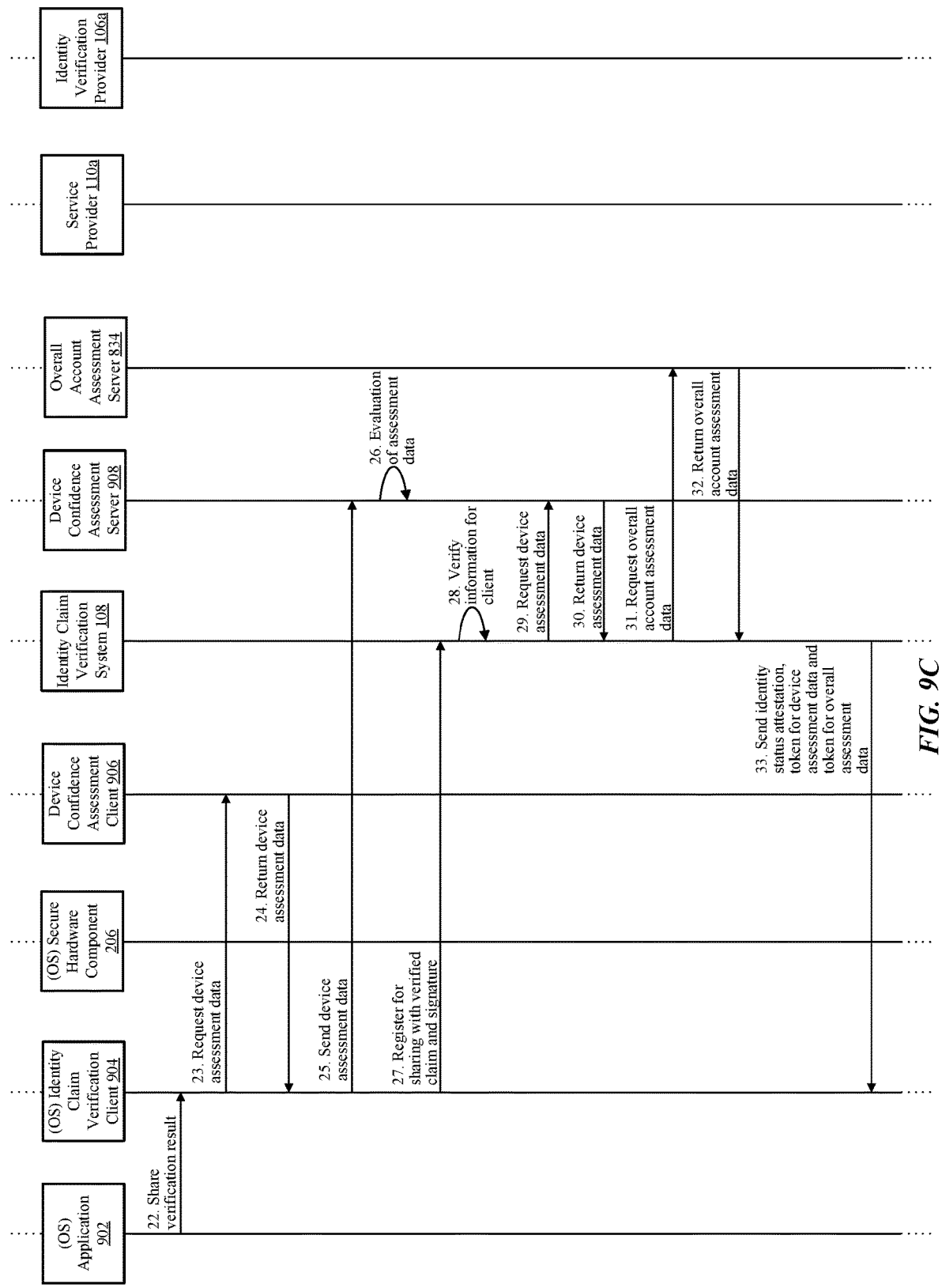
Figure 9D:
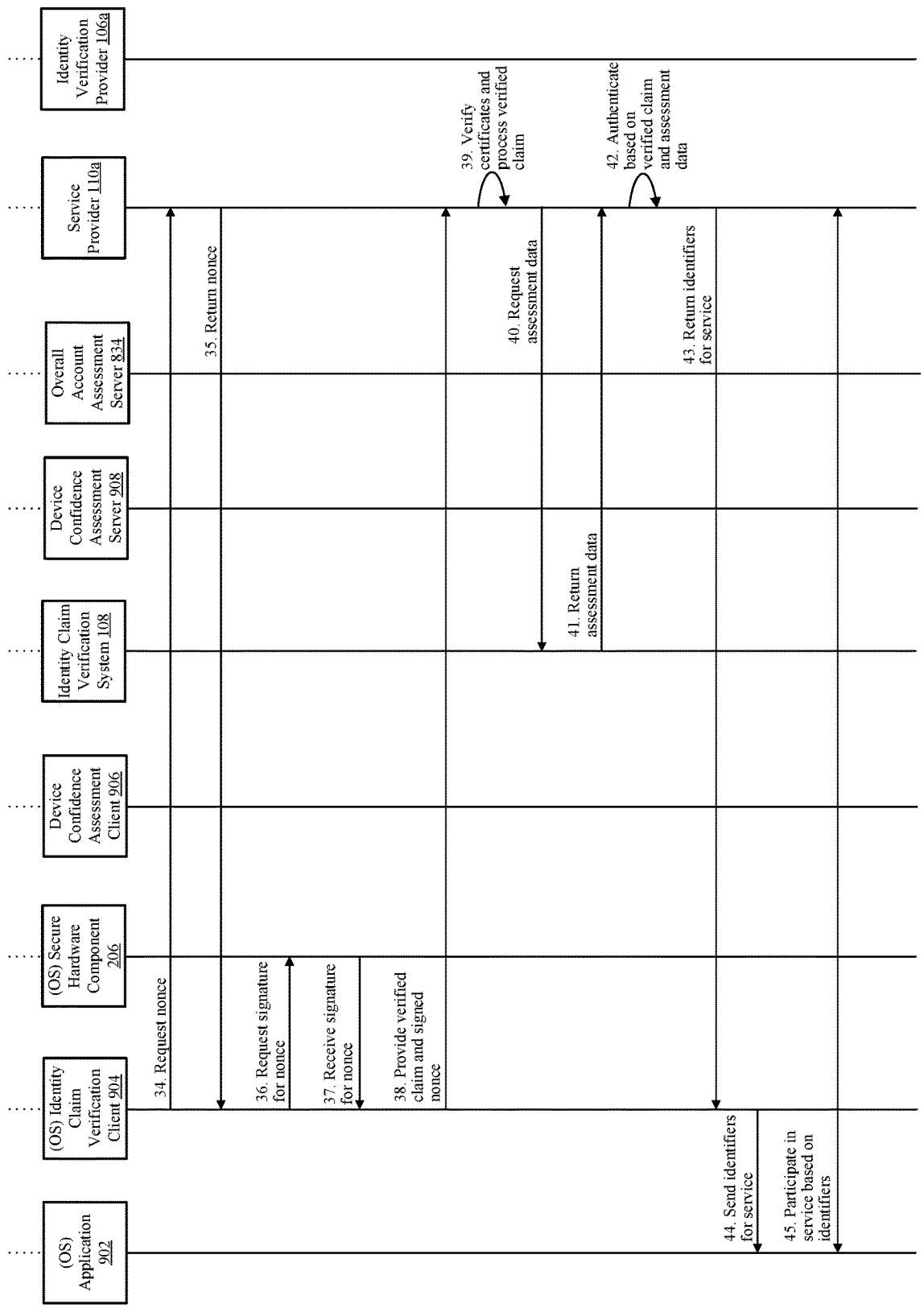

Turning to FIG. 9C, operations 22-31 relate to registering for sharing (e.g., the verified claim), as well as computing and storing assessments with respect to the verified claim. As noted above, the assessments may relate to a comparison of the user information included in the verified claim against local device content that corresponds to the user information. In this regard, device confidence assessment client 906 and the device confidence assessment server 908 correspond to the confidence assessments related to the data stored on the device. In addition, the assessments may relate to an overall assessment of the user account (e.g., corresponding with the overall account assessment server 834). Moreover, the assessments may relate to agency data accessible by the identity verification providers 106a-106n.

At operation 22, the application 902 shares a verification result with the identity claim verification client 904. At operation 23, the identity claim verification client 904 requests device assessment data from the device confidence assessment client 906. For example, the identity claim verification client 904 may communicate with the device confidence assessment client 906 with respect to how the user information included in the verified claim may be compared against corresponding information stored on the electronic device 102a (e.g., based on training signals).

As noted above, the assessment profile(s) (e.g., see operation 6) may correspond to model(s) trained with data sets across multiple users for different service providers. In this regard, the training signals may correspond to data provided by the electronic device 102a to a server (e.g., the identity claim verification system 108) in order to update and/or re-train the server-generated model (e.g., corresponding to the assessment profile). Thus, the model may be trained based on crowd-sourcing, and on a continual basis. In one or more implementations, the model may be provided to the electronic device 102a on a periodic basis, and/or upon the electronic device 102a requesting an assessment profile (e.g., in conjunction with operation 6). Moreover, the training signals may be provided by the electronic device 102a to the server(s) in conjunction with a user opting in to provide such training signals.

At operation 24, the device confidence assessment client 906 returns the device assessment data to the identity verification client 904, which in turn sends the device assessment data to the device confidence assessment server 908 at operation 25. The device confidence assessment server 908 may evaluate the device assessment data at operation 26.

At operation 27, the identity claim verification client 904 registers for sharing by sending a request to the identity claim verification system 108. For example, as noted above, the request may include the verified claim with signature, and an indication of the service provider (e.g., 110a) for sharing the verified claim with. At operation 28, the identity claim verification system 108 may verify information for the client (e.g., signed key pairs).

At operations 29-30, the identity claim verification system 108 requests and obtains the device assessment data (e.g., corresponding to comparisons against device data) from the device confidence assessment server 908. At operations 31-32, the identity claim verification system 108 requests and obtains overall account assessments (e.g., corresponding to overall user account reputation) from the overall account assessment server 834. The device assessment data and overall assessment data may be stored by the identity claim verification system 108, for providing to the service provider 110a.

As noted above, third type of attestation may correspond to an identity status attestation, in which the identity claim verification system 108 verifies that the verified claim is still valid (e.g., has not been revoked due to the device being lost or due to fraudulent activity). For example, the identity claim verification system 108 may sign another certificate to indicate the current valid state of the verified claim. Thus, at operation 33, the identity claim verification system 108 may provide provides an identity status attestation (e.g., the third attestation), together with token(s) for assessment, to the electronic device 102a (314). The tokens for assessment may relate to the device assessment data and/or overall account assessment data. As noted above, the tokens may correspond to unique identifiers for uniquely identifying a particular service provider (e.g., the service provider 110a) from among the service providers 110a-110n Turning to FIG. 9D, operations 34-45 relate to the service provider 110a providing a nonce for signing by the electronic device 102a, in association with the service provider 110a requesting the verified claim from the electronic device 102a and assessment data from the identity claim verification system 108. Operations 34-35 relate to the service provider 110a providing the nonce to the identity claim verification client 904. At operations 36-37, the identity claim verification client 904 signs the nonce with the private key (e.g., stored on the secure hardware component 206).

The identity claim verification client 904 sends the verified claim and signed nonce to the service provider 110a at operation 38. As noted above with respect to operation 33, the identity claim verification client 904 may have received an identity status attestation from the identity claim verification system 108 (e.g., that the verified claim is still valid and has not been revoked), and token(s) for assessment data). Prior to or in conjunction with operation 38, the electronic device 102a may provide an indication of the identity status attestation and/or the token(s) for assessment data to the service provider 110a.

As noted above, the workflow (e.g., provided to the electronic device at operation 8) may be specific to the service provider 110a, and may indicate any biometric authentication requirements for a particular service provider (e.g., a bank may require one or more of on-device facial recognition, fingerprint recognition, iris recognition, signature recognition and/or the like). Thus, if biometric authentication is required by the workflow, operation 38 may be performed after the user has successfully performed such biometric authentication. The electronic device 102a will embed specific user authentication performed during this process into the digital signature of operation 38. This will enable the service provider 110a to validate the authentication level and determine a confidence/trust level.

The service provider 110a may evaluate the identity status attestation and/or the tokens in determining whether to onboard and/or provide service to the user of the electronic device 102a. In addition, the service provider 110a may verify that the verified claim came from the electronic device 102a (e.g., and not from another device) based on the signed nonce (operation 39).

At operations 40-41, the service provider 110a requests and receives the assessment data, that was determined and stored by the identity claim verification system 108. As noted above, the assessment data may indicate comparisons of the user information in the verified claim against data stored locally on the device (e.g., in the form of a first response vector). The assessment data may further be based on agency data known by the identity verification provider 106a (e.g., in the form of a second response vector). The assessment data may further include overall user account assessments. The one or more of the assessments (e.g., the aggregated assessment data) may be used by the service provider 110*a* as additional information for determining whether or not to onboard and/or provide service to the electronic device 102*a*. Operations 43-44 relate to the service provider 110*a* providing corresponding identifiers to the identity claim verification client 904 and the application 902, such that the application 902 may participate in service with the service provider at operation 45. In one or more implementations, one or more of the operations 1-45 may be repeated with respect to services (e.g., provided by one or more of the service providers 110*a*-110*n*) and/or for re-registering for service.

Figure 10:
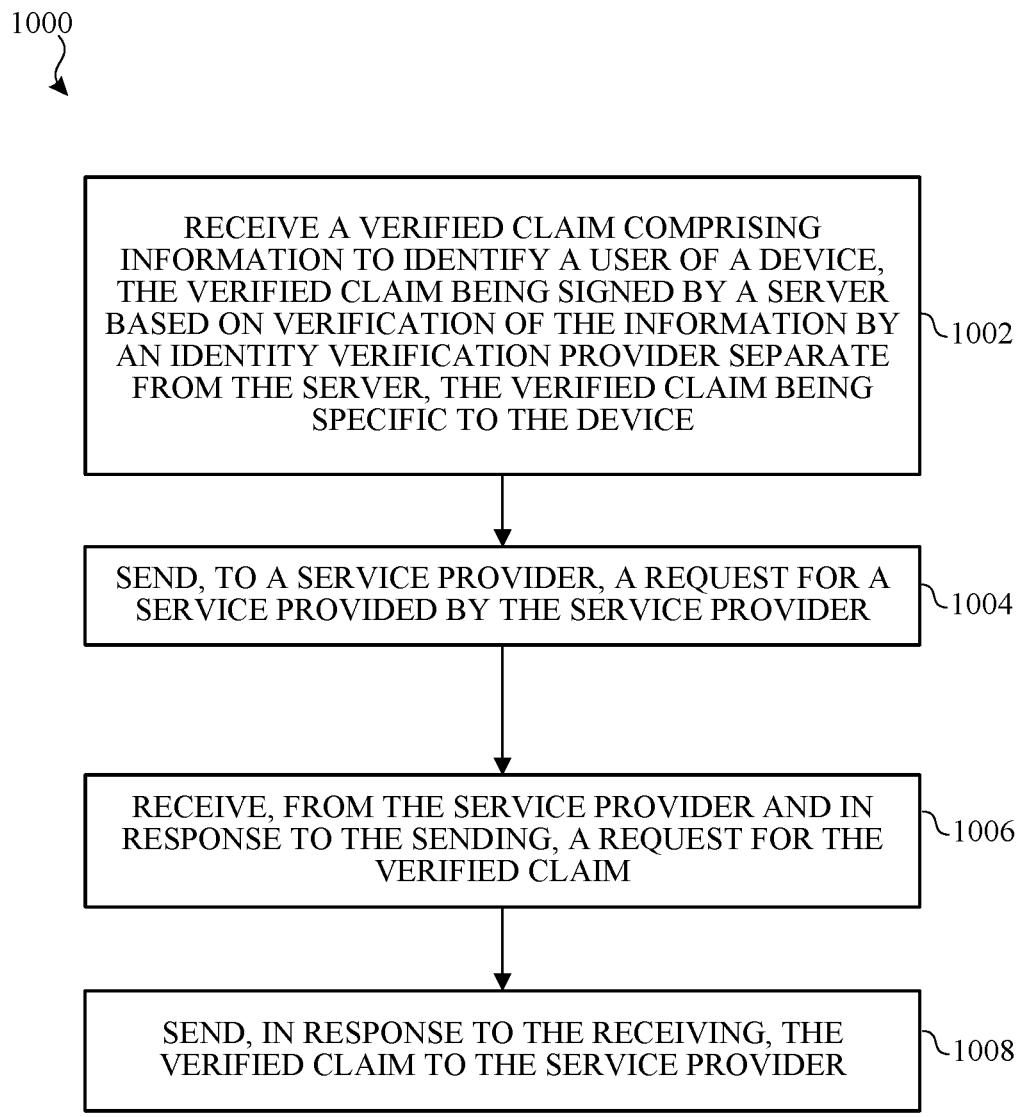
FIG. 10 illustrates a flow diagram of an example process for using a verified claim to receive service from a service provider in accordance with one or more implementations.

FIG. 10 illustrates a flow diagram of an example process for using a verified claim to receive service from a service provider in accordance with one or more implementations. For explanatory purposes, the process 1000 is primarily described herein with reference to the electronic device 102*a*, the identity verification provider 106*a*, the identity claim verification system 108 and the service provider 110*a* of FIG. 1. However, the process 1000 is not limited to the electronic device 102*a*, the identity verification provider 106*a*, the identity claim verification system 108 and the service provider 110*a* of FIG. 1, and one or more blocks (or operations) of the process 1000 may be performed by one or more other components and other suitable devices (e.g., any of the electronic devices 102*a*-102*d*, the identity verification providers 106*a*-106*n* and/or the service providers 110*a*-110*n*). Further for explanatory purposes, the blocks of the process 1000 are described herein as occurring in serial, or linearly. However, multiple blocks of the process 1000 may occur in parallel. In addition, the blocks of the process 1000 need not be performed in the order shown and/or one or more blocks of the process 1000 need not be performed and/or can be replaced by other operations.

The electronic device 102*a* receives a verified claim including information to identify a user of the electronic device 102*a* (1002). The verified claim is signed by a server (e.g., the identity claim verification system 108) based on verification of the information by an identity verification provider (e.g., the identity verification provider 106*a*) separate from the identity claim verification system 108. The verified claim is specific to the electronic device 102*a* (e.g., via a hardware/software reference key and/or a hardware/software device identifier).

The identity claim verification system 108 may be configured to generate the verified claim as part of a digital identity enrollment process. The identity verification provider 106*a* may be a trusted service for verifying the information to identify the user.

The verified claim may correspond to a Merkle tree with nodes storing data fields corresponding to the information to identify the user. The Merkle tree may be configured for selective sharing of the data fields based on the nodes.

The verified claim may be a composite claim. The identity claim verification system 108 may be configured to generate the composite claim based on verification of the information by the identity verification provider 106*a* and at least one second identity verification provider (e.g., one of more of the identity verification providers 106*b*-106*n*).

Prior to receiving the verified claim, the electronic device 102*a* may generate the hardware/software reference key and/or hardware/software device identifier based at least in part on a hardware component (e.g., the secure hardware component 206) of the electronic device 102*a*, and transmit, to the identity claim verification system 108, a request for the verified claim, the request being specific to the electronic device 102*a*.

The electronic device 102*a* sends, to the service provider 110*a*, a request for a service provided by the service provider 110*a* (1004). The electronic device 102*a* receives, from the service provider 110*a* and in response to the sending, a request for the verified claim 1006).

The electronic device 102*a* sends, in response to the receiving, the verified claim to the service provider 110*a* (1008). The service provider 110*a* may be configured to provide service to the electronic device 102*a* based on the verified claim.

The hardware/software reference key and/or hardware/software device identifier may be a public key of a public-private key pair, a corresponding private key of which is securely stored on the electronic device 102*a* (e.g., in the hardware secure element 206). The request for the verified claim may include a nonce, and the electronic device 102*a* may sign the nonce with the private key, and send the signed nonce with the verified claim to the service provider 110*a*.

The electronic device 102*a* may receive, from the service provider 110*a* and in response to the sending, an identity certificate for sending to the service provider 110*a* with respect to subsequent authentication with the service provider 110*a*. The electronic device 102*a* may authenticate the user via facial recognition, fingerprint recognition, and/or another user authentication mechanism, prior to sending the identity certificate to the service provider 110*a*.

The electronic device 102*a* may send, to a second service provider (e.g., the service provider 110*b*), a request for a second service provided by the service provider 110*b*. The electronic device 102*a* may receive, from the service provider 110*b* and in response to sending the request for the second service, a second request for the verified claim. The electronic device 102*a* may send, in response to receiving the second request, the verified claim to the service provider 110*b*.

Figure 11:
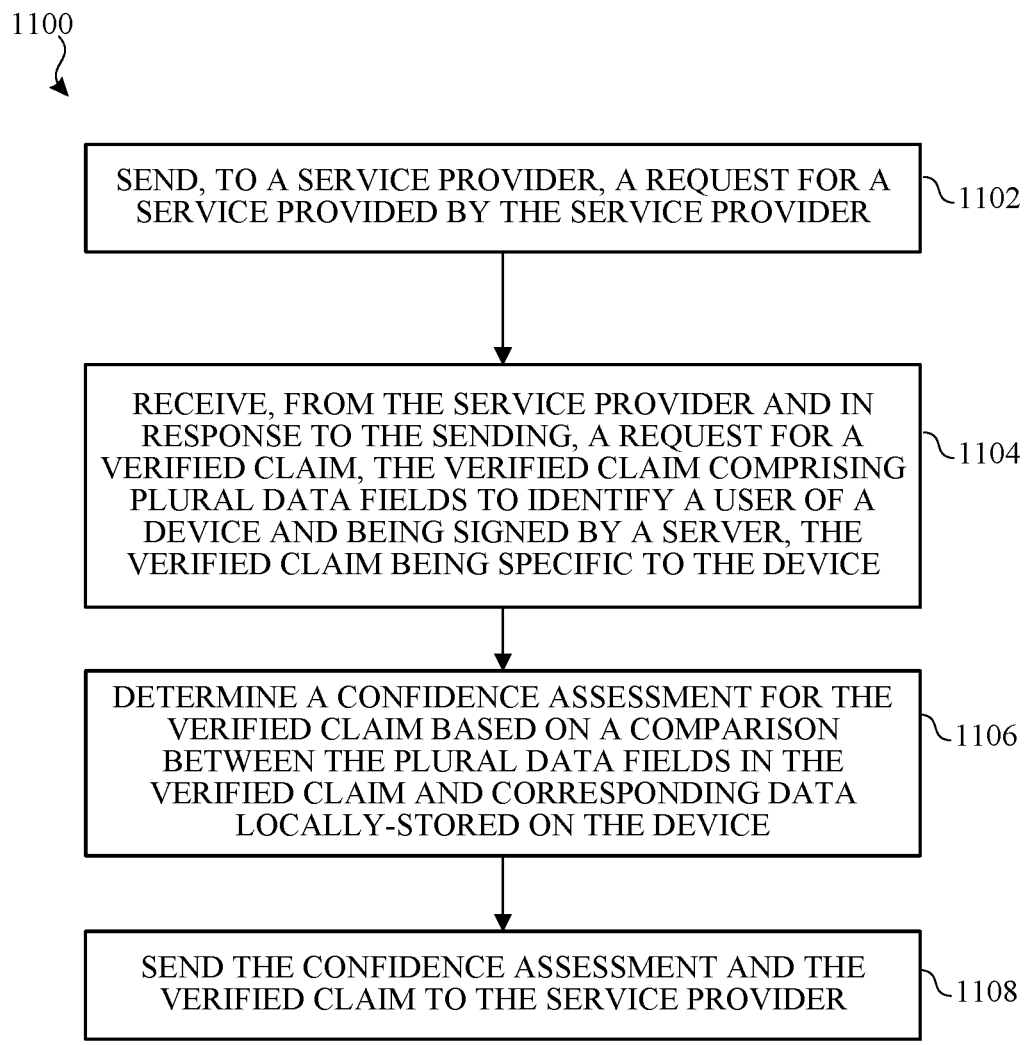
FIG. 11 illustrates a flow diagram of an example process for providing a confidence assessment for a verified claim in accordance with one or more implementations.

FIG. 11 illustrates a flow diagram of an example process for providing a confidence assessment for a verified claim in accordance with one or more implementations. For explanatory purposes, the process 1100 is primarily described herein with reference to the electronic device 102*a*, the identity verification provider 106*a*, the identity claim verification system 108 and the service provider 110*a* of FIG. 1. However, the process 1100 is not limited to the electronic device 102*a*, the identity verification provider 106*a*, the identity claim verification system 108 and the service provider 110*a* of FIG. 1, and one or more blocks (or operations) of the process 1100 may be performed by one or more other components and other suitable devices (e.g., any of the electronic devices 102*a*-102*d*, the identity verification providers 106*a*-106*n* and/or the service providers 110*a*-110*n*). Further for explanatory purposes, the blocks of the process 1100 are described herein as occurring in serial, or linearly. However, multiple blocks of the process 1100 may occur in parallel. In addition, the blocks of the process 1100 need not be performed in the order shown and/or one or more blocks of the process 1100 need not be performed and/or can be replaced by other operations.

The electronic device 102*a* sends, to a service provider (e.g., the service provider 110*a*), a request for a service provided by the service provider (1102). The electronic device 102*a* receives, from the service provider 110*a* and in response to the sending, a request for a verified claim 1104). The verified claim includes plural data fields to identify a user of the electronic device 102*a* and is signed by a server (e.g., the identity claim verification system 108). The verified claim is specific to the electronic device 102*a*.

The electronic device 102*a* may receive the verified claim from the identity claim verification system 108. The verified claim may be generated by the identity claim verification system 108 based on verification of the plural data fields by an identity verification provider (e.g., the identity verification provider 106*a*).

The verified claim may correspond to a Merkle tree with nodes storing the plural data fields to identify the user. The Merkle tree may be configured for selective sharing of the plural data fields based on the nodes.

In response to the receiving, the electronic device 102*a* determines a confidence assessment for the verified claim based on a comparison between the plural data fields in the verified claim and corresponding data locally-stored on the electronic device 102*a* (1106). The locally-stored data may include at least one of email content, message content, social networking content or third party application content corresponding to the plural data fields in the verified claim.

Prior to the determining, the electronic device 102*a* may prompt the user for authorization to access the data locally-stored on the electronic device 102*a*, and may receive user input authorizing access to the data locally-stored on the electronic device 102*a*.

The electronic device 102*a* sends the confidence assessment and the verified claim to the service provider 110*a* (1108). The service provider 110*a* may be configured to authenticate the user for service based on the verified claim and the confidence assessment. The service provider 110*a* may be further configured to authenticate the user for service based on an assessment of the plural data fields by at least one of an identity verification provider 106*a* or an overall account assessment service.

Figure 12:
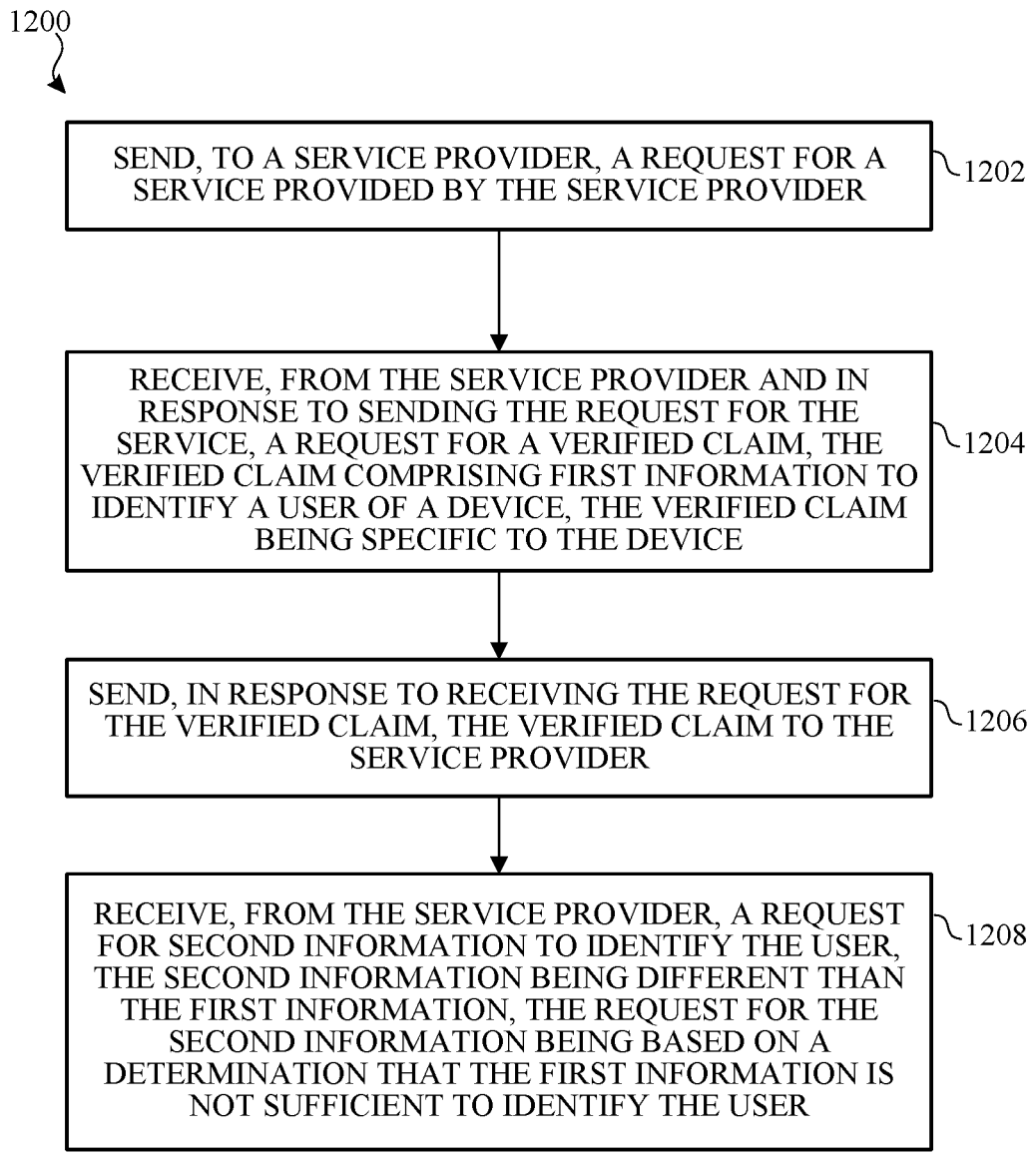
FIG. 12 illustrates a flow diagram of an example process for requesting additional information from a user based on the information included with a verified claim in accordance with one or more implementations.

FIG. 12 illustrates a flow diagram of an example process for requesting additional information from a user based on the information included with a verified claim in accordance with one or more implementations. For explanatory purposes, the process 1200 is primarily described herein with reference to the electronic device 102*a*, the identity verification provider 106*a*, the identity claim verification system 108 and the service provider 110*a* of FIG. 1. However, the process 1200 is not limited to the electronic device 102*a*, the identity verification provider 106*a*, the identity claim verification system 108 and the service provider 110*a* of FIG. 1, and one or more blocks (or operations) of the process 1200 may be performed by one or more other components and other suitable devices (e.g., any of the electronic devices 102*a*-102*d*, the identity verification providers 106*a*-106*n* and/or the service providers 110*a*-110*n*). Further for explanatory purposes, the blocks of the process 1200 are described herein as occurring in serial, or linearly. However, multiple blocks of the process 1200 may occur in parallel. In addition, the blocks of the process 1200 need not be performed in the order shown and/or one or more blocks of the process 1200 need not be performed and/or can be replaced by other operations.

The electronic device 102*a* sends, to a service provider (e.g., the service provider 110*a*), a request for a service provided by the service provider 110*a* (1202). The electronic device 102*a* receives, from the service provider 110*a* and in response to sending the request for the service, a request for a verified claim 1204).

The verified claim includes first information to identify a user of the electronic device 102*a*. The verified claim includes is specific to the electronic device 102*a*. The electronic device 102*a* may receive the verified claim from an identity claim verification system 108. The verified claim may be generated by the identity claim verification system 108 based on verification of the information by an identity verification provider 106*a*.

The verified claim may correspond to a Merkle tree with nodes storing plural data fields corresponding to the first information. The Merkle tree may be configured for selective sharing of the plural data fields based on the nodes.

The electronic device 102*a* sends, in response to receiving the request for the verified claim, the verified claim to the service provider 110*a* (1206). The electronic device 102*a* receives, from the service provider 110*a*, a request for second information to identify the user (1208). The second information is different than the first information, and the request for the second information is based on a determination that the first information is not sufficient to identify the user.

The determination that the first information is not sufficient to identify the user may correspond to an indication that the electronic device 102*a* has been lost. The identity claim verification system 108 may be configured to send an indication of the determination, that the first information is not sufficient to identify the user, to the service provider 110*a*.

The electronic device 102*a* may prompt the user for the second information. In response to the prompting, the electronic device 102*a* may receive user input corresponding to the second information. The service provider 110*a* may be configured to authenticate the user for service based on the first information and the second information.

Figure 13:
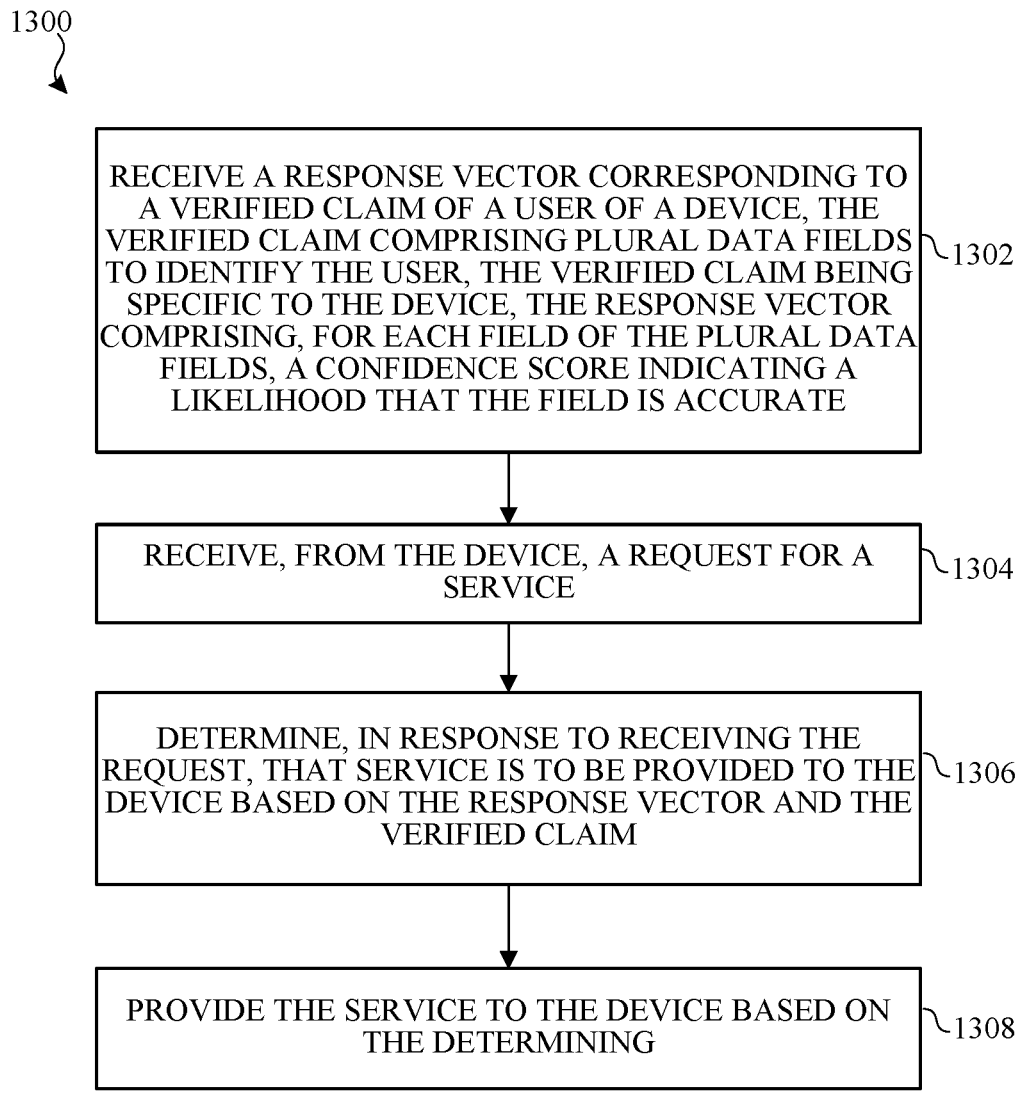
FIG. 13 illustrates a flow diagram of an example process for providing service to a device based on a response vector for a verified claim in accordance with one or more implementations.

FIG. 13 illustrates a flow diagram of an example process for providing service to a device based on a response vector for a verified claim in accordance with one or more implementations. For explanatory purposes, the process 1300 is primarily described herein with reference to the electronic device 102*a*, the identity verification provider 106*a*, the identity claim verification system 108, and the service provider 110*a* of FIG. 1. However, the process 1300 is not limited to the electronic device 102*a*, the identity verification provider 106*a*, the identity claim verification system 108 and the service provider 110*a* of FIG. 1, and one or more blocks (or operations) of the process 1300 may be performed by one or more other components and other suitable devices (e.g., any of the electronic devices 102*a*-102*d*, the identity verification providers 106*a*-106*n* and/or the service providers 110*a*-110*n*). Further for explanatory purposes, the blocks of the process 1300 are described herein as occurring in serial, or linearly. However, multiple blocks of the process 1300 may occur in parallel. In addition, the blocks of the process 1300 need not be performed in the order shown and/or one or more blocks of the process 1300 need not be performed and/or can be replaced by other operations.

The service provider 110*a* receives a response vector corresponding to a verified claim of a user of the electronic device 102*a* (1302). The verified claim includes plural data fields to identify the user, the verified claim being specific to the electronic device 102*a*. The response vector includes, for each field of the plural data fields, a confidence score indicating a likelihood that the field is accurate.

The verified claim may be generated by an identity claim verification system 108 based on verification of the plural data fields by an identity verification provider (e.g., the identity verification provider 106*a*). The service provider 110*a* may receive the verified claim from the electronic device 102*a*.

The verified claim may correspond to a Merkle tree with nodes storing the plural data fields to identify the user. The Merkle tree may be configured for selective sharing of the plural data fields based on the nodes.

The service provider 110*a* receives, from the electronic device 102*a*, a request for a service (1304). The service provider 110*a* determines, in response to receiving the request, that service is to be provided to the electronic device 102*a* based on the response vector and/or the verified claim 1306). The service provider 110*a* provides the service to the electronic device 102*a* based on the determining (1308).

Determining that service is to be provided to the electronic device 102*a* may include determining an overall confidence score indicating a likelihood that the plural data fields are accurate, based on the confidence scores of the response vector. Determining the overall confidence score may include assigning, for each field of the plural data fields, a respective weighted value to the confidence score for the field, and determining the overall confidence score based on the respective weighted values applied to the confidence scores.

The service provider 110*a* may receive at least one of a first assessment or a second assessment of the verified claim. The first assessment may be received from the electronic device 102*a* based on a comparison between the plural data fields in the verified claim and corresponding data locally-stored on the electronic device 102*a*. The second assessment may be received from an overall account assessment service based on the plural data fields in the verified claim. Determining that service is to be provided to the electronic device 102*a* may be further based on the at least one first assessment or second assessment.

Figure 14:
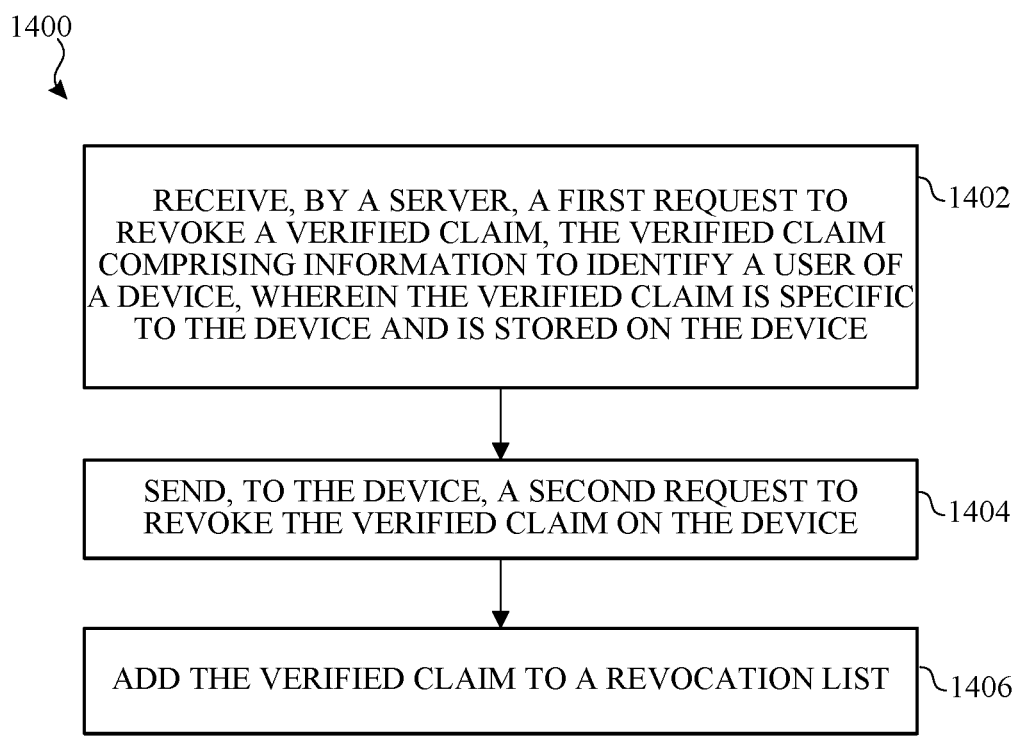
FIG. 14 illustrates a flow diagram of an example process for revoking a verified claim in accordance with one or more implementations.

FIG. 14 illustrates a flow diagram of an example process for revoking a verified claim in accordance with one or more implementations. For explanatory purposes, the process 1400 is primarily described herein with reference to the electronic device 102*a*, the identity verification provider 106*a*, the identity claim verification system 108 and the service provider 110*a* of FIG. 1. However, the process 1400 is not limited to the electronic device 102*a*, the identity verification provider 106*a*, the identity claim verification system 108 and the service provider 110*a* of FIG. 1, and one or more blocks (or operations) of the process 1400 may be performed by one or more other components and other suitable devices (e.g., any of the electronic devices 102*a*-102*d*, the identity verification providers 106*a*-106*n* and/or the service providers 110*a*-110*n*). Further for explanatory purposes, the blocks of the process 1400 are described herein as occurring in serial, or linearly. However, multiple blocks of the process 1400 may occur in parallel. In addition, the blocks of the process 1400 need not be performed in the order shown and/or one or more blocks of the process 1400 need not be performed and/or can be replaced by other operations.

An identity claim verification system 108 (e.g., the identity claim verification system 108) receives a first request to revoke a verified claim, the verified claim including information to identify a user of the electronic device 102*a* (1402). The verified claim is specific to the electronic device 102*a* and is stored on the electronic device 102*a*. For example, the verified claim may be specific to the electronic device 102*a* by a hardware/software reference key and/or a hardware/software device identifier generated by the electronic device 102*a*, in association with a hardware component of the electronic device 102*a*.

Prior to receiving the first request, the identity claim verification system 108 may receive, from the electronic device 102*a*, a request for the verified claim, the request being specific to the electronic device 102*a*. The identity claim verification system 108 may generate and sign the verified claim based on based on verification of the information by an identity verification provider (e.g., the identity verification provider 106*a*) that is separate from the identity claim verification system 108. The identity claim verification system 108 may transmit the verified claim to the electronic device 102*a*.

The first request may be received from a service (e.g., a service for locating a device and/or determining if a device has been lost) based on an indication that the electronic device 102*a* has been lost. Alternatively or in addition, the first request may be received from the electronic device 102*a*, based on first user input received at the electronic device 102*a* to revoke the verified claim.

The electronic device 102*a* may be configured to receive second user input to display the information to identify the user, and display, in response to receiving the second user input, the information to identify the user. The electronic device 102*a* may be further configured to receive second user input to partially revoke the verified claim, the second user input indicating a portion of the information to revoke, and remove, in response to receiving the second user input, the portion of the information from the verified claim.

In response to receiving the first request, the identity claim verification system 108 sends, to the electronic device 102*a*, a second request to revoke the verified claim on the electronic device 102*a* (1404). The second request may include a request to delete the verified claim on the electronic device 102*a*.

The hardware/software reference key and/or hardware/software device identifier may be a public key of a public-private key pair, a corresponding private key of which is securely stored on the electronic device 102*a*. The second request may include a request to delete the private key. The electronic device 102*a* may be configured to delete the private key securely stored on the electronic device 102*a* in response to receiving the second request.

The identity claim verification system 108 adds the verified claim to a revocation list (1406). The identity claim verification system 108 may receive, from a service provider (e.g., the service provider 110*a*), a request for a status of the verified claim. The service provider 110*a* may be configured to provide service to the electronic device 102*a* based on the status of the verified claim. In response to receiving the request for the status, the identity claim verification system 108 may determine that the verified claim is included on the revocation list, and transmit, to the service provider 110*a*, an indication that the verified claim is revoked.

Alternatively or in addition, the identity claim verification system 108 may provide the revocation list to one or more service providers (e.g., the service provider 110*a*-110*n*). The service providers 110*a*-110*n* may be configured to provide service to the electronic device 102*a* based on the revocation list.

As described above, one aspect of the present technology is the gathering and use of data available from specific and legitimate sources for digital identity enrollment. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used for digital identity enrollment. Accordingly, use of such personal information data may facilitate transactions (e.g., on-line transactions). Further, other uses for personal information data that benefit the user are also contemplated by the present disclosure. For instance, health and fitness data may be used, in accordance with the user's preferences to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of enrolling for a digital identity, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Figure 15:
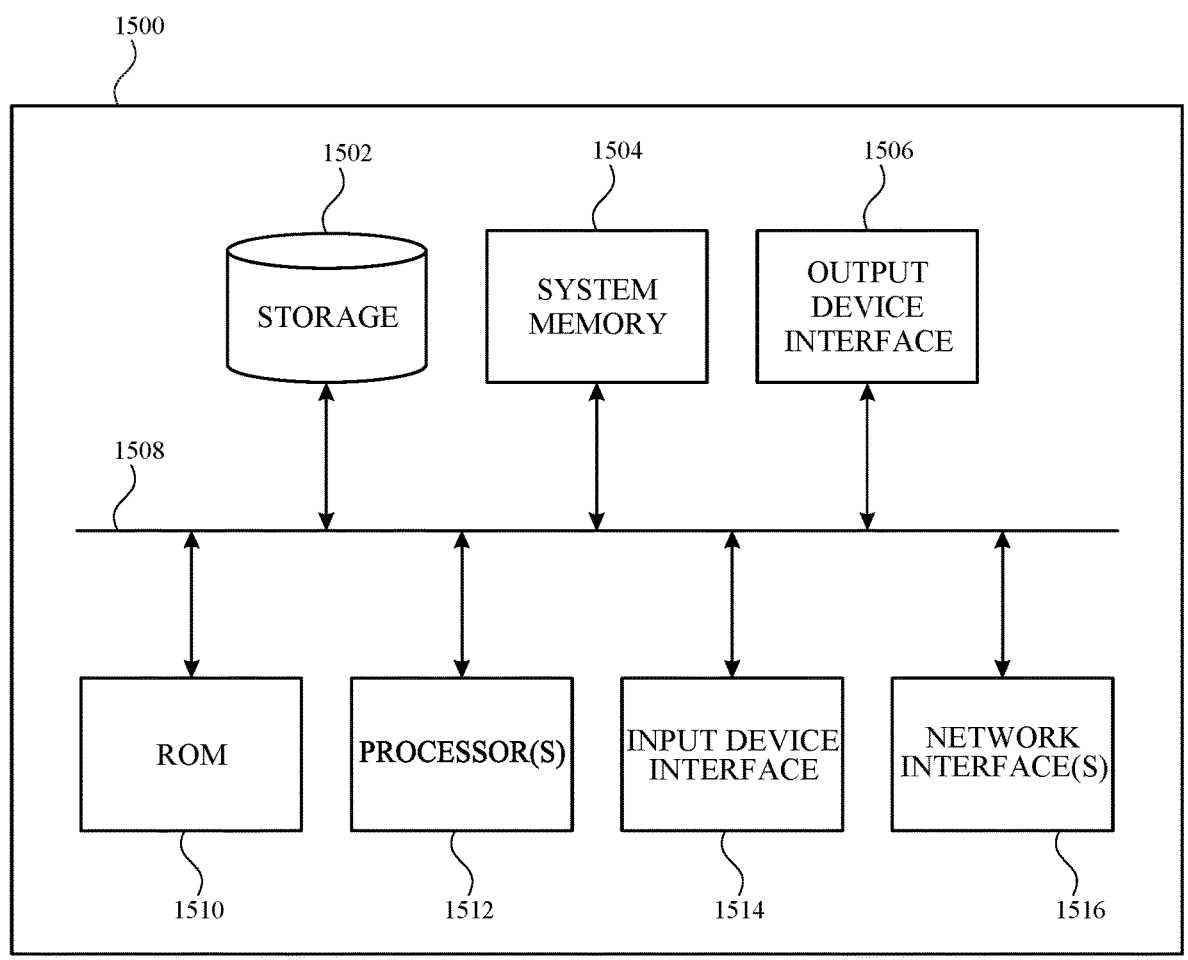
FIG. 15 illustrates an example electronic system with which aspects of the subject technology may be implemented in accordance with one or more implementations.

FIG. 15 illustrates an example electronic system with which aspects of the subject technology may be implemented in accordance with one or more implementations. The electronic system 1500 can be, and/or can be a part of, one or more of the electronic devices 102a-102d, identity verification providers 106a-106n, the identity claim verification system 108 and/or the service providers 110a-110n shown in FIG. 1. The electronic system 1500 may include various types of computer readable media and interfaces for various other types of computer readable media. The electronic system 1500 includes a bus 1508, one or more processing unit(s) 1512, a system memory 1504 (and/or buffer), a ROM 1510, a permanent storage device 1502, an input device interface 1514, an output device interface 1506, and one or more network interfaces 1516, or subsets and variations thereof.

The bus 1508 collectively represents all system, peripheral, and chipset buses that communicatively connect the numerous internal devices of the electronic system 1500. In one or more implementations, the bus 1508 communicatively connects the one or more processing unit(s) 1512 with the ROM 1510, the system memory 1504, and the permanent storage device 1502. From these various memory units, the one or more processing unit(s) 1512 retrieves instructions to execute and data to process in order to execute the processes of the subject disclosure. The one or more processing unit(s) 1512 can be a single processor or a multi-core processor in different implementations.

The ROM 1510 stores static data and instructions that are needed by the one or more processing unit(s) 1512 and other modules of the electronic system 1500. The permanent storage device 1502, on the other hand, may be a read-and-write memory device. The permanent storage device 1502 may be a non-volatile memory unit that stores instructions and data even when the electronic system 1500 is off. In one or more implementations, a mass-storage device (such as a magnetic or optical disk and its corresponding disk drive) may be used as the permanent storage device 1502.

In one or more implementations, a removable storage device (such as a floppy disk, flash drive, and its corresponding disk drive) may be used as the permanent storage device 1502. Like the permanent storage device 1502, the system memory 1504 may be a read-and-write memory device. However, unlike the permanent storage device 1502, the system memory 1504 may be a volatile read-and-write memory, such as random access memory. The system memory 1504 may store any of the instructions and data that one or more processing unit(s) 1512 may need at runtime. In one or more implementations, the processes of the subject disclosure are stored in the system memory 1504, the permanent storage device 1502, and/or the ROM 1510. From these various memory units, the one or more processing unit(s) 1512 retrieves instructions to execute and data to process in order to execute the processes of one or more implementations.

The bus 1508 also connects to the input and output device interfaces 1514 and 1506. The input device interface 1514 enables a user to communicate information and select commands to the electronic system 1500. Input devices that may be used with the input device interface 1514 may include, for example, alphanumeric keyboards and pointing devices (also called "cursor control devices"). The output device interface 1506 may enable, for example, the display of images generated by electronic system 1500. Output devices that may be used with the output device interface 1506 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 15, the bus 1508 also couples the electronic system 1500 to one or more networks and/or to one or more network nodes, such as the electronic devices 102-104 shown in FIG. 1, through the one or more network interface(s) 1516. In this manner, the electronic system 1500 can be a part of a network of computers (such as a LAN, a wide area network ("WAN"), or an Intranet, or a network of networks, such as the Internet. Any or all components of the electronic system 1500 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method comprising:
  receiving a user request to initiate a process to create a verified claim comprising information to identify a user of the electronic device;
  receiving user input comprising the information to identify the user for the verified claim;
  transmitting, to a server, a request for the verified claim, the request comprising the information to identify the user and the request being specific to the electronic device;
  receiving the verified claim comprising the information to identify the user of the device, the verified claim being signed by the server based on verification of the information by an identity verification provider separate from the server, the verified claim being specific to a hardware reference key of the device;
  sending, to a service provider, a request for a service provided by the service provider;
  receiving, from the service provider and in response to the sending, a request for the verified claim;
  sending, in response to the receiving and in conjunction with a user authentication, the verified claim to the service provider; and
  receiving the service from the service provider based at least in part on at least one of: an attestation by the server that the verified claim is valid, or transmission of a signed nonce to the service provider in conjunction with sending the verified claim.

2. The method of claim 1, wherein the verified claim is further specific to at least one of a software reference key that references the device, a hardware device identifier or a software device identifier.

3. The method of claim 1, further comprising, prior to receiving the verified claim:
  generating the hardware reference key in association with a hardware component of the device.

4. The method of claim 1, wherein the hardware reference key is a public key of a public-private key pair, a corresponding private key of which is stored on the device.

5. The method of claim 4, wherein the request for the verified claim comprises a nonce, the method further comprising:
  signing the nonce with the private key; and
  sending the signed nonce with the verified claim to the service provider.

6. The method of claim 1, further comprising:
  sending, to a second service provider, a request for a second service provided by the second service provider;
  receiving, from the second service provider and in response to sending the request for the second service, a second request for the verified claim; and
  sending, in response to receiving the second request, the verified claim to the second service provider.

7. The method of claim 1, wherein the server is configured to generate the verified claim as part of a digital identity enrollment process, and
  wherein the identity verification provider is a trusted service for verifying the information to identify the user.

8. The method of claim 1, wherein the verified claim is a composite claim, and wherein the server is configured to generate the composite claim based on verification of the information by the identity verification provider and at least one second identity verification provider.

9. The method of claim 1, further comprising:
receiving, from the service provider and in response to the sending the verified claim, an identity certificate for sending to the service provider with respect to subsequent authentication with the service provider.

10. The method of claim 9, wherein the information to identify the user is provided based on a workflow associated with the service provider, the workflow specifying a biometric authentication requirement for authenticating the user, the method further comprising:
authenticating the user via based on the biometric authentication requirement prior to sending the identity certificate to the service provider.

11. The method of claim 1, wherein the verified claim corresponds to a Merkle tree with nodes storing data fields corresponding to the information to identify the user.

12. The method of claim 11, wherein the Merkle tree is configured for selective sharing of the data fields based on the nodes.

13. The method of claim 1, further comprising:
sending, to the server, a request to register for sharing the verified claim;
receiving, from the server, an attestation that the verified claim is valid; and
sending, to the service provider, an indication of the attestation.

14. A device, comprising:
at least one processor; and
a memory including instructions that, when executed by the at least one processor, cause the at least one processor to:
receive a user request to initiate a process to create a verified claim comprising information to identify a user of the device;
receive user input comprising the information to identify the user for the verified claim;
transmit, to a server, a request for the verified claim, the request comprising the information to identify the user and the request being specific to the device;
receive the verified claim comprising the information to identify the user of the device, the verified claim being a digital certificate signed by the server based on verification of the information by an identity verification provider that is separate from the server, the verified claim being associated with a hardware reference key of the device;
send, to a service provider, a request for a service provided by the service provider;
receive, from the service provider and in response to the sending, a request for the verified claim;
send, in response to the receiving and in conjunction with a user authentication, the verified claim to the service provider; and
receive the service from the service provider based at least in part on at least one of: an attestation by the server that the verified claim is valid, or transmission of a signed nonce to the service provider in conjunction with sending the verified claim.

15. The device of claim 14, wherein the verified claim is further associated at least one of a software reference key that references the device, a hardware device identifier or a software device identifier.

16. The device of claim 14, wherein the instructions further cause the at least one processor to, prior to receiving the verified claim:
generate the hardware reference key in association with a hardware component of the device.

17. The device of claim 14, wherein the hardware reference key is a public key of a public-private key pair, a corresponding private key of which is securely stored on the device.

18. The device of claim 17, wherein the request for the verified claim comprises a nonce, the instructions further causing the at least one processor to:
sign the nonce with the private key; and
send the signed nonce with the verified claim to the service provider.

19. The device of claim 14, wherein the instructions further cause the at least one processor to:
receiving a second verified claim comprising second information to identify the user of the device, the second verified claim being signed by the server based on verification of the information by a second identity verification provider separate from the server, the second verified claim being specific to the device;
sending, to a second service provider, a request for a service provided by the second service provider;
receiving, from the second service provider and in response to the sending, a request for the second verified claim; and
sending, in response to the receiving, the second verified claim to the second service provider,
wherein the verified claim is different than the second verified claim, and
wherein the service provider is different than the second service provider.

20. A system comprising:
an electronic device configured to:
receive a user request to initiate a process to create a verified claim comprising information to identify a user of the electronic device, the verified claim being associated with a hardware reference key of the electronic device;
receive user input comprising the information to identify the user for the verified claim; and
transmit, to a server, a request for the verified claim, the request comprising the information to identify the user and the request being specific to the electronic device; and
the server configured to:
transmit, to an identity verification provider separate from the server, a request to verify the information to identify the user;
receive, from the identity verification provider, a verification of the information to identify the user; and
provide the verified claim to the electronic device,
wherein the verified claim is usable by the electronic device to receive, in conjunction with a user authentication, service from a service provider, based on at least one of: an attestation by the server that the verified claim is valid, or a transmission of the verified claim and a signed nonce from the electronic device to the service provider.

21. The system of claim 20, wherein the information to identify the user comprises at least two data items and the identity verification provider is configured to verify that the at least two data items correspond to the user based on verification information obtained from a third party source separate from the electronic device.

22. The system of claim 21, wherein the at least two data items comprise at least a name of a user and a postal address of a user.

23. The system of claim 20, wherein the verified claim is usable by the electronic device to receive the service from the service provider based on the transmission of the verified claim and the signed nonce from the electronic device to the service provider.

* * * * *